(12) United States Patent
Hasegawa

(10) Patent No.: US 8,306,358 B2
(45) Date of Patent: Nov. 6, 2012

(54) IMAGE PROCESSING APPARATUS, IMAGE PROCESSING METHOD, AND IMAGING APPARATUS FOR SLICING AN IMAGE

(75) Inventor: Yuichi Hasegawa, Tokyo (JP)

(73) Assignee: Sony Corporation (JP)

( * ) Notice: Subject to any disclaimer, the term of this patent is extended or adjusted under 35 U.S.C. 154(b) by 1158 days.

(21) Appl. No.: 11/897,209

(22) Filed: Aug. 29, 2007

(65) Prior Publication Data

US 2008/0069468 A1    Mar. 20, 2008

(30) Foreign Application Priority Data

Sep. 4, 2006   (JP) ................................ P2006-238917

(51) Int. Cl.
| G06K 9/36 | (2006.01) |
| G06K 9/34 | (2006.01) |
| G06K 9/00 | (2006.01) |
| G04N 7/18 | (2006.01) |

(52) U.S. Cl. ......... 382/282; 382/118; 382/173; 348/135
(58) Field of Classification Search .................. 382/115, 382/118, 164, 162, 254, 288, 293; 348/222.1, 348/234, 345, 223.1
See application file for complete search history.

(56) References Cited

U.S. PATENT DOCUMENTS

| 6,545,743 | B1 * | 4/2003 | Luo et al. .................... 355/18 |
| 6,654,506 | B1 * | 11/2003 | Luo et al. .................... 382/282 |
| 6,697,502 | B2 * | 2/2004 | Luo ............................. 382/115 |
| 6,748,097 | B1 * | 6/2004 | Gindele et al. ............... 382/112 |
| 6,847,733 | B2 * | 1/2005 | Savakis et al. ............... 382/225 |
| 7,212,668 | B1 * | 5/2007 | Luo et al. .................... 382/165 |
| 7,333,654 | B2 * | 2/2008 | Luo et al. .................... 382/165 |
| 7,660,445 | B2 * | 2/2010 | Ray ............................. 382/118 |
| 2005/0012833 | A1 | 1/2005 | Yokota et al. |
| 2006/0204055 | A1 * | 9/2006 | Steinberg et al. ............ 382/118 |
| 2008/0019575 | A1 * | 1/2008 | Scalise et al. ................ 382/118 |

FOREIGN PATENT DOCUMENTS

| JP | 62-169284 A | 7/1987 |
| JP | 8-110603 A | 4/1996 |
| JP | 2000-098456 A | 4/2000 |
| JP | 2004-356848 A | 12/2004 |
| JP | 2005-012833 A | 1/2005 |
| JP | 2005-033508 A | 2/2005 |

OTHER PUBLICATIONS

Unsupervised automation of photographic composition rules in digital still cameras (Proceedings Paper). Serene Banerjee and Brian L. Evans, Jun. 7, 2004.

* cited by examiner

*Primary Examiner* — Vu Le
*Assistant Examiner* — Andrae S Allison
(74) *Attorney, Agent, or Firm* — Lerner, David, Littenberg, Krumholz & Mentlik, LLP

(57) ABSTRACT

An image processing apparatus detects a center of gravity of each of plural images of interest, which are images to which attention is paid among images included in an original image; calculates an overall center of gravity, which is a center of gravity of all the plural images of interest, from the center of gravity of each of the plural images of interest; and determines an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

26 Claims, 23 Drawing Sheets

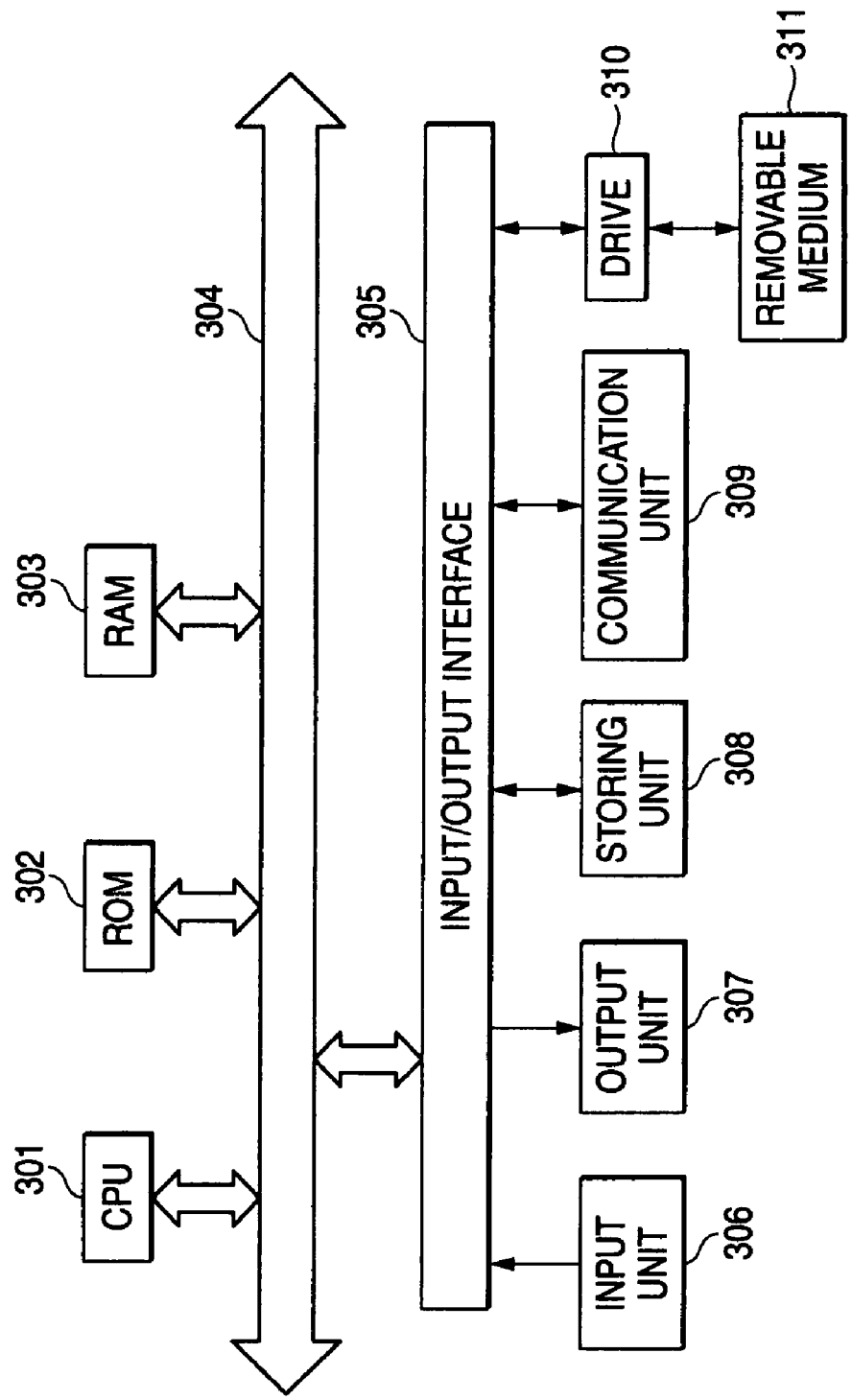

IMAGE PROCESSING APPARATUS, IMAGE PROCESSING METHOD, AND IMAGING APPARATUS FOR SLICING AN IMAGE

CROSS-REFERENCE TO RELATED APPLICATIONS

The present application claims priority from Japanese Patent Application No. JP 2006-238917, filed in the Japanese Patent Office on Sep. 4, 2006, the entire content of which is incorporated herein by reference.

BACKGROUND OF THE INVENTION

1. Field of the Invention

The present invention relates to an image processing apparatus and an image processing method, a computer program, and an imaging apparatus, and, more particularly to an image processing apparatus and an image processing method, a computer program, and an imaging apparatus that are adapted to be capable of easily slicing an image of a preferable composition.

2. Description of the Related Art

Digital still cameras that image subjects and record (store) images (photographs) as data are widely used.

When later looking at photographs that were casually taken with digital still cameras such as commemorative photographs, group photographs, snapshots, or scenery photographs, you may feel that the compositions of the photographs are not satisfactory.

In most cases, if the image of a subject such as a person, an animal, or a still life is sliced to be arranged in a desirable position in the photograph, the photograph becomes to have a preferable composition. Processing for this slicing is performed by once capturing the data of an image (hereinafter referred to as image data) from the digital still camera into a personal computer and causing the personal computer to execute a program having a slicing function.

There is known a camera in which an imaging unit switches a photographing direction and a camera performs range finding for respective unit range finding areas obtained by dividing a subject area, regards an area indicating a short distance as a main subject area, and controls the photographing direction of the imaging unit to place the main subject area in the center of a screen and, at the same time, controls zooming to show a subject in a fixed size or larger (see, for example, JP-A-2000-98456).

SUMMARY OF THE INVENTION

In slicing an image using a personal computer, a user has to perform various kinds of complicated operations.

The user sometimes takes time in deciding how to appropriately slice an image from an original photograph. Such a decision is difficult if the user does not have an aesthetic sense.

Therefore, it is desirable to make it possible to easily slice an image having a preferable composition.

According to an embodiment of the present invention, there is provided an image processing apparatus including detecting means for detecting the center of gravity of each of plural images of interest, which are images to which attention is paid among images included in an original image, calculating means for calculating an overall center of gravity, which is the center of gravity of all the plural images of interest, from the center of gravity of each of the plural images of interest, and determining means for determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

Generating means for slicing an image in the area, which is determined by the determining means, from the original image and generating a new image can be further provided in the image processing apparatus.

Converting means for converting the number of pixels of the new image generated by the generating means into a predetermined number of pixels can be further provided in the image processing apparatus.

The determining means can be caused to determine the area of a rectangular shape such that a ratio of a distance from one edge of vertically or horizontally opposed edges of the rectangular area to the overall center of gravity to a distance from the other edge of the opposed edges of the area to the overall center of gravity takes the value decided in advance so as to arouse an aesthetic sense.

The determining means can be caused to determine the rectangular area having an aspect ratio same as an aspect ratio of the original image.

The determining means can be caused to determine the area of a largest size in the original image.

The determining means can be caused to determine the area such that the ratio takes any value from 1:1 to 1:2.2.

The determining means can be caused to determine the area such that the ratio is 1:2.

The determining means can be caused to determine the area in the original image such that a ratio of a distance from one edge of vertically opposed edges of the area to the overall center of gravity to a distance from the other edge of the vertically opposed edges of the area to the overall center of gravity is 1:2.

The determining means can be caused to determine the area such that the ratio is the golden ratio.

The determining means can be caused to determine the area in the original image such that a ratio of a distance from one edge of vertically opposed edges of the area to the overall center of gravity to a distance from the other edge of the vertically opposed edges of the area to the overall center of gravity is the golden ratio.

The detecting means can be caused to detect a degree of interest of each of the plural images of interest and the calculating means is caused to calculate the overall center of gravity from the center of gravity of each of the plural images of interest with the degree of interest as a weight.

According to another embodiment of the present invention, there is provided an image processing method including the steps of detecting the center of gravity of each of plural images of interest, which are images to which attention is paid among images included in an original image, calculating an overall center of gravity, which is the center of gravity of all the plural images of interest, from the center of gravity of each of the plural images of interest, and determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

According to still another embodiment of the present invention, there is provided a computer program for causing a computer to execute the steps of detecting the center of gravity of each of plural images of interest, which are images to which attention is paid among images included in an original image, calculating an overall center of gravity, which is the center of gravity of all the plural images of interest, from the center of gravity of each of the plural images of interest, and determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

According to still another embodiment of the present invention, there is provided an imaging apparatus including detecting means for detecting the center of gravity of each of plural images of interest, which are images to which attention is paid among images included in an original image, calculating means for calculating an overall center of gravity, which is the center of gravity of all the plural images of interest, from the center of gravity of each of the plural images of interest, and determining means for determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

According to still another embodiment of the present invention, the center of gravity of each of plural images of interest, which are images to which attention is paid among images included in an original image, is detected, an overall center of gravity, which is the center of gravity of all the plural images of interest, is calculated from the center of gravity of each of the plural images of interest, and an area in the original image is determined such that a ratio of a distance from one edge of opposed edges of the area to the overall center of gravity to a distance from the other edge of the opposed edges of the area to the overall center of gravity takes a value decided in advance so as to arouse an aesthetic sense.

As described above, according to the embodiments of the present invention, it is possible to form an image in a preferable composition.

According to the embodiments of the present invention, it is possible to easily slice an image having a preferable composition.

BRIEF DESCRIPTION OF THE DRAWINGS

FIG. 23 is a block diagram showing an example of a structure of a personal computer.

DESCRIPTION OF THE PREFERRED EMBODIMENTS

Embodiments of the present invention will be hereinafter explained. A correspondence relation between elements of the present invention and the embodiments described or shown in the specification or the drawings is described as follows. This description is for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that the embodiment does not correspond to elements other than the element.

Figure 4:
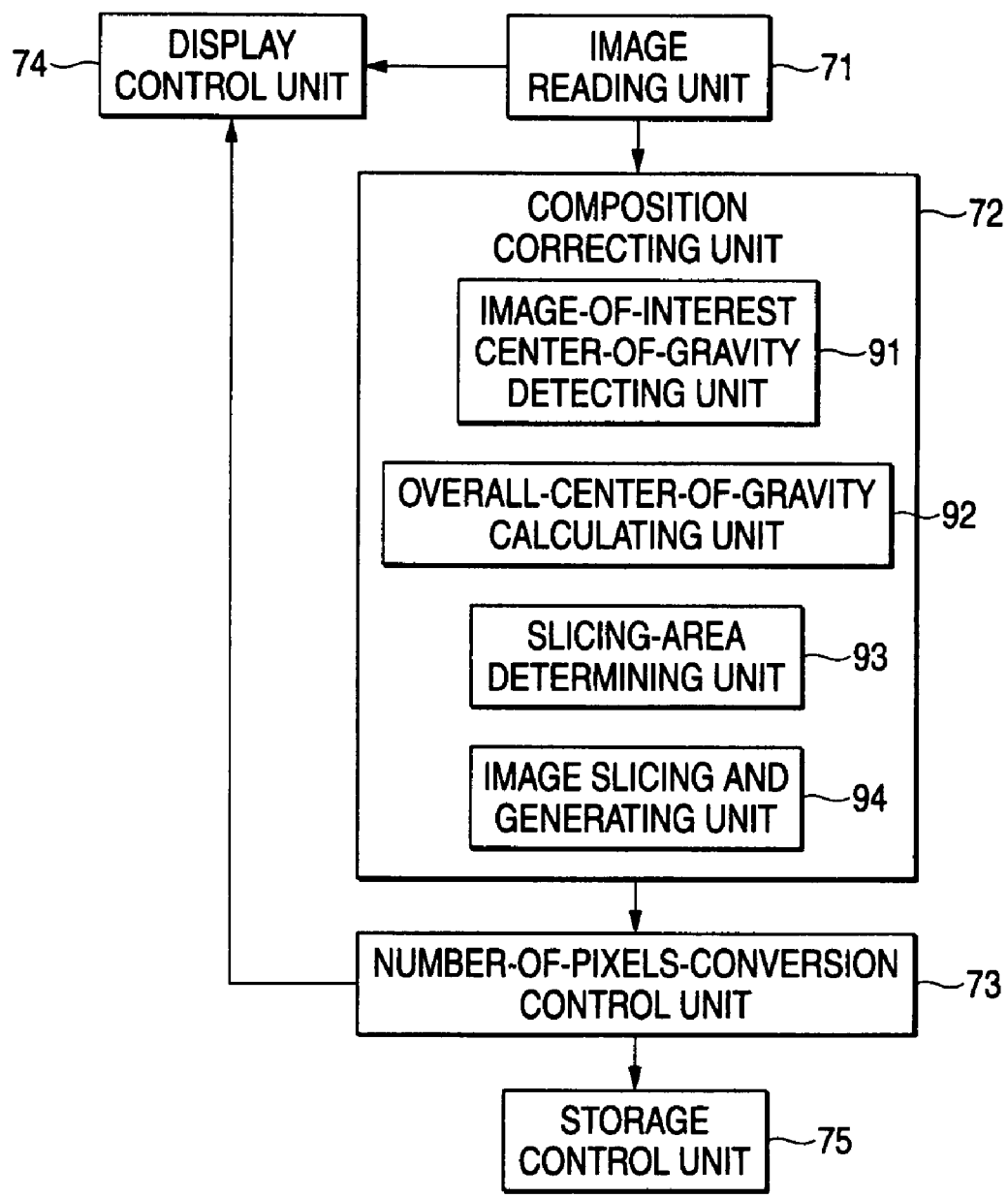
FIG. 4 is a block diagram showing a structure of functional units realized by a control CPU that executes a computer program.

An image processing apparatus according to an embodiment of the present invention includes detecting means (e.g., an image-of-interest center-of-gravity detecting unit 91 in FIG. 4) for detecting the center of gravity of each of plural images of interest, which are images to which attention is paid among images included in an original image, calculating means (e.g., an overall-center-of-gravity calculating unit 92 in FIG. 4) for calculating an overall center of gravity, which is the center of gravity of all the plural images of interest, from the center of gravity of each of the plural images of interest, and determining means (e.g., a slicing-area determining unit 93 in FIG. 4) for determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

Generating means (e.g., an image slicing and generating unit 94 in FIG. 4) for slicing an image in the area, which is determined by the determining means, from the original image and generating a new image can be further provided in the image processing apparatus.

Converting means (e.g., a number-of-pixels converting engine 54 in FIG. 3) for converting the number of pixels of the new image generated by the generating means into a predetermined number of pixels can be further provided in the image processing apparatus.

Figure 5:
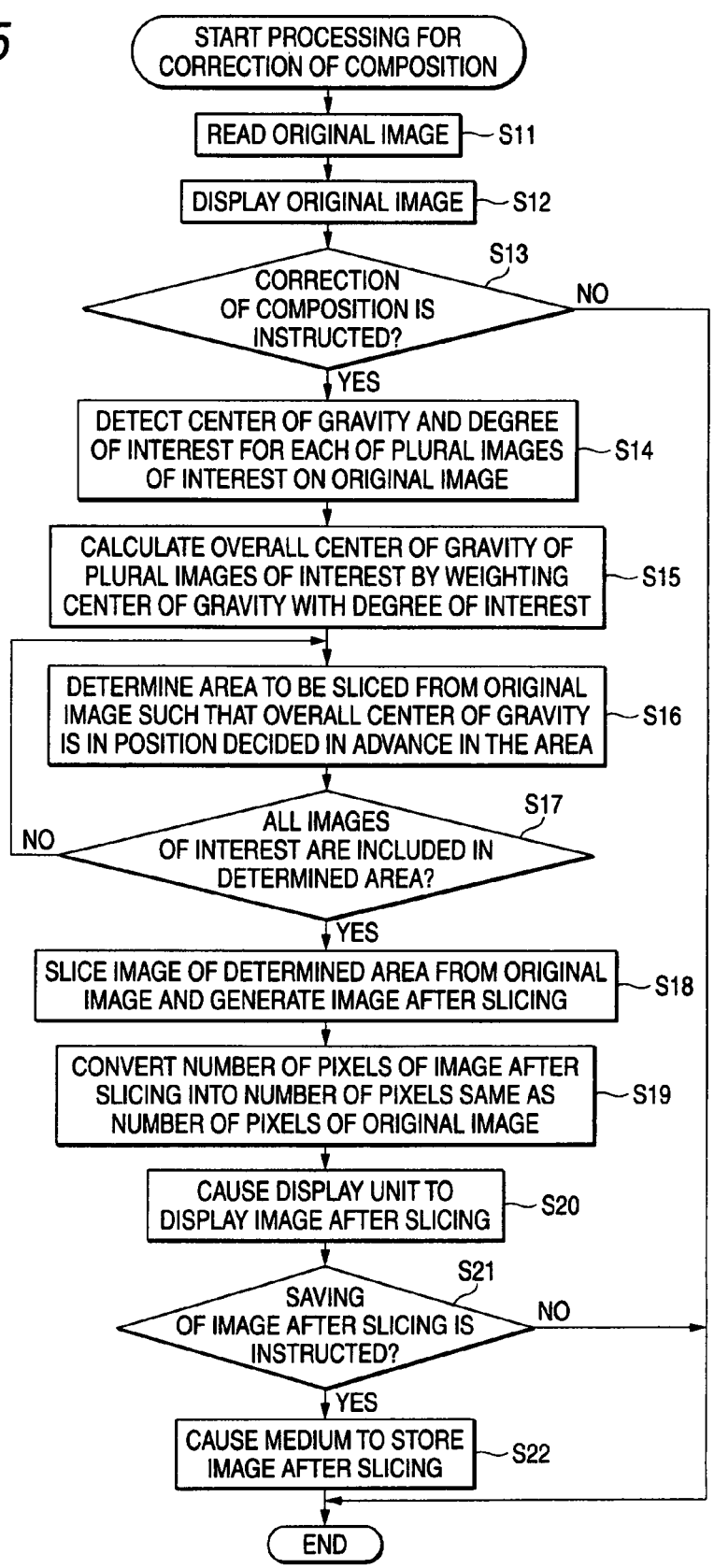
FIG. 5 is a flowchart for explaining an example of processing for correction of a composition.

An image processing method according to another embodiment of the present invention includes the steps of detecting the center of gravity of each of plural images of interest, which are images to which attention is paid among images included in an original image (e.g., step S14 in FIG. 5), calculating an overall center of gravity, which is the center of gravity of all the plural images of interest, from the center of gravity of each of the plural images of interest (e.g., step S15 in FIG. 5), and determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense (e.g., step S16 in FIG. 5).

A computer program according to still another embodiment of the present invention causes a computer to execute the steps of detecting the center of gravity of each of plural images of interest, which are images to which attention is paid among images included in an original image (e.g., step S14 in FIG. 5), calculating an overall center of gravity, which is the center of gravity of all the plural images of interest, from the center of gravity of each of the plural images of interest (e.g., step S15 in FIG. 5), and determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense (e.g., step S16 in FIG. 5).

An imaging apparatus according to still another embodiment of the present invention includes detecting means (e.g., an image-of-interest center-of-gravity detecting unit 91 in FIG. 4) for detecting the center of gravity of each of plural images of interest, which are images to which attention is paid among images included in an original image, calculating means (e.g., an overall-center-of-gravity calculating unit 92 in FIG. 4) for calculating an overall center of gravity, which is the center of gravity of all the plural images of interest, from the center of gravity of each of the plural images of interest, and determining means (e.g., a slicing-area determining unit 93 in FIG. 4) for determining an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

Figure 1:
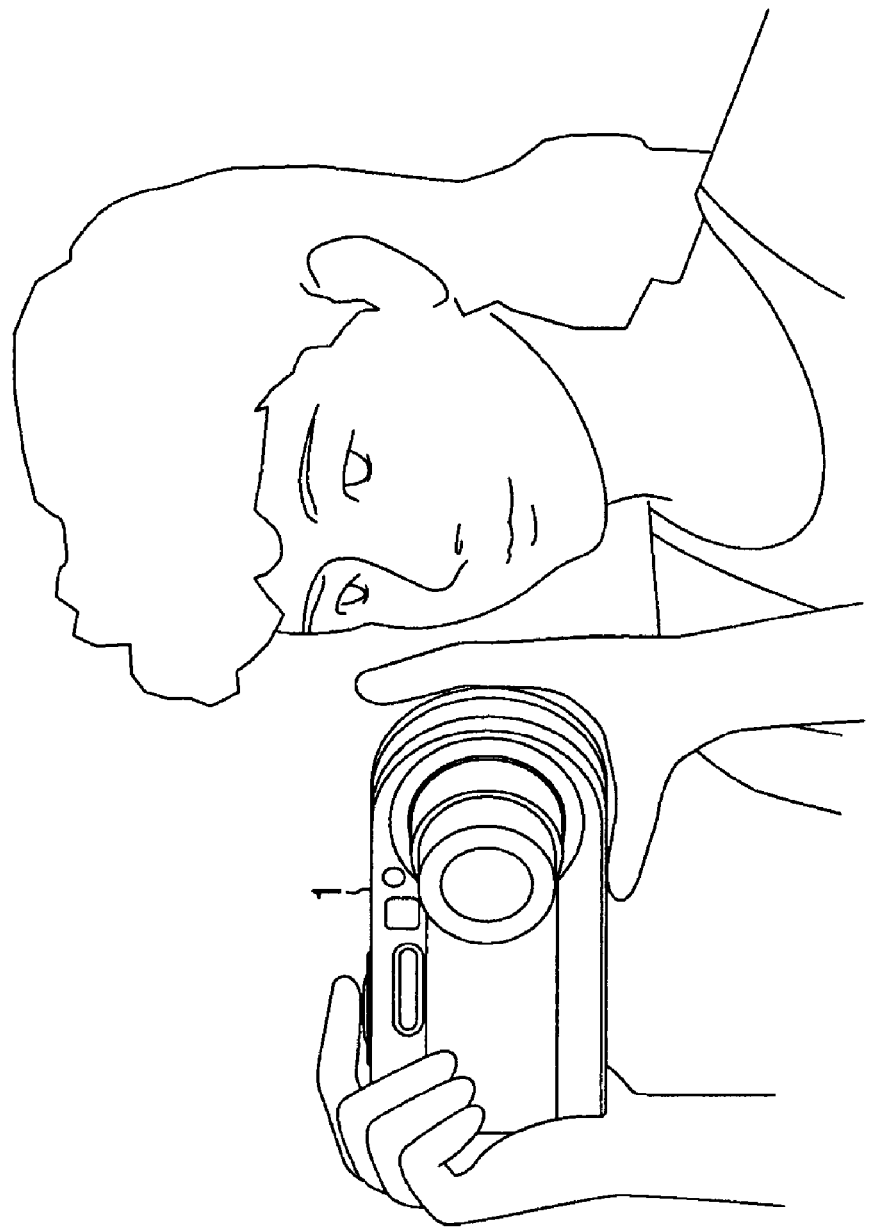
FIG. 1 is a diagram showing a digital camera according to an embodiment of the present invention.
Figure 2:
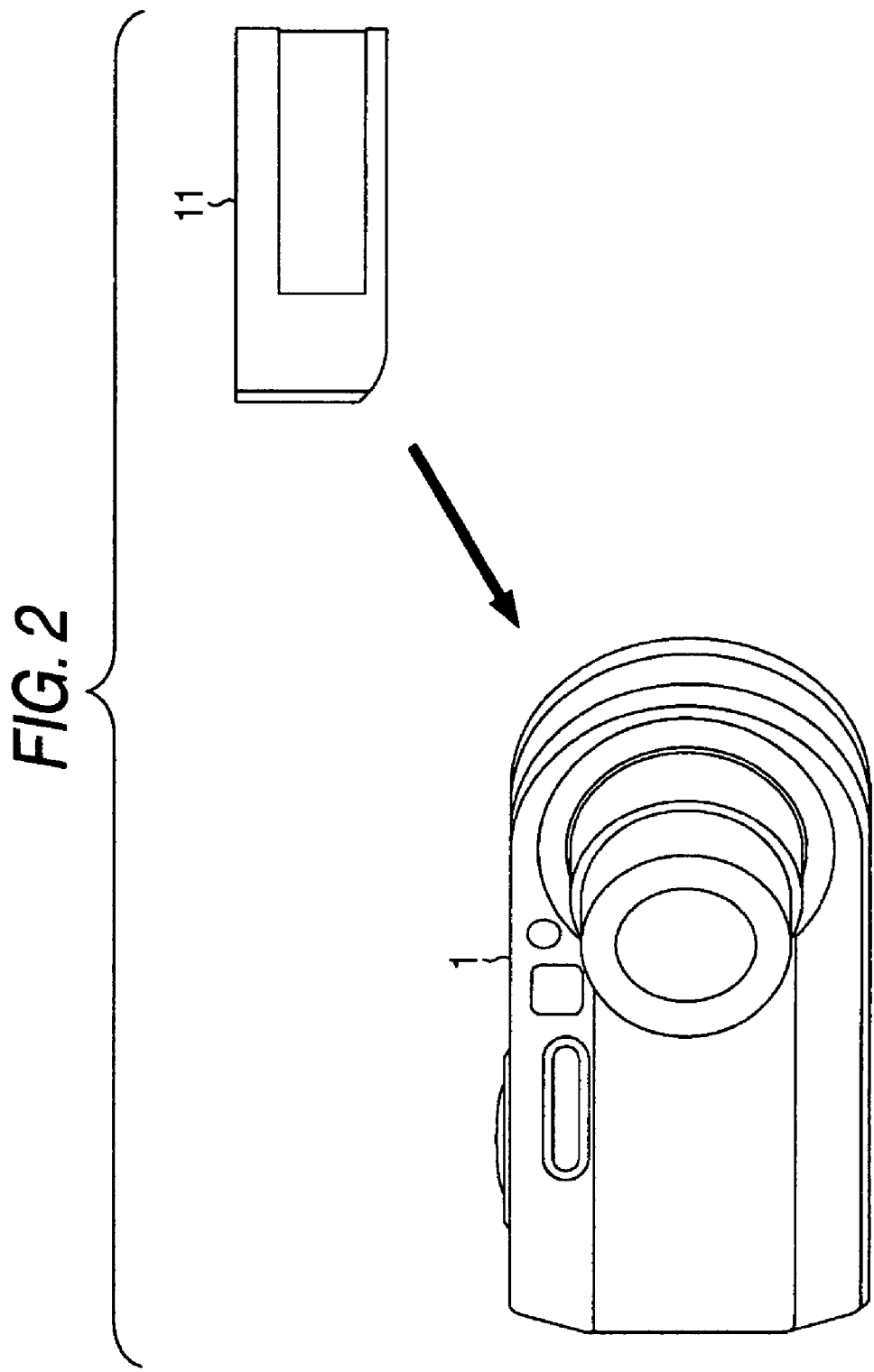
FIG. 2 is a diagram showing the digital camera according to the embodiment.

FIGS. 1 and 2 are diagrams showing a digital camera 1 according to an embodiment of the present invention. As shown in FIG. 1, the digital camera 1 images a subject according to operation by a user and stores (records) an image (a photograph), which is a still image of the subject, as image data.

The digital camera 1 corrects the composition of the image imaged and stored as the image data.

As shown in FIG. 2, the digital camera 1 corrects the composition of an image stored (recorded) as image data in a medium 11 which a memory card incorporating a nonvolatile semiconductor memory or the like and is inserted in the digital camera 1. Image data of images taken by the digital camera 1 or other digital cameras is stored (recorded) in the medium 11.

The medium 11 is not limited to the memory card incorporating a semiconductor memory or the like and may be a magnetic disk such as a hard disk, an optical disk or a magneto-optical disk such as a DVD (Digital Versatile Disc), or the like. The medium 11 may be detachably inserted or may be built in the digital camera 1.

Figure 3:
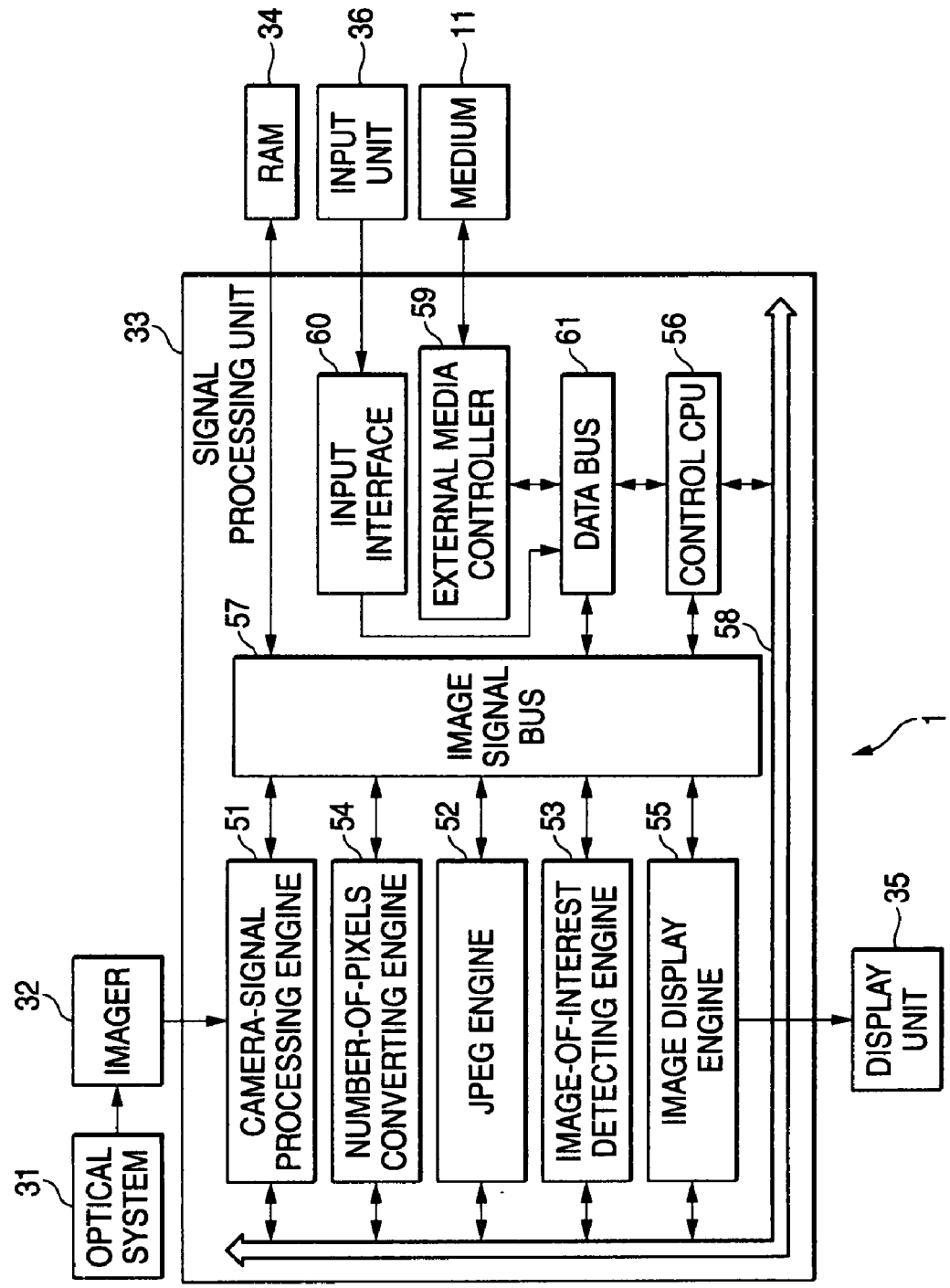
FIG. 3 is a block diagram showing an example of a structure of the digital camera.

FIG. 3 is a block diagram showing an example of the structure of the digital camera 1. The digital camera 1 includes an optical system 31, an imager 32, a signal processing unit 33, a RAM (Random Access Memory) 34, a display unit 35, and an input unit 36.

The optical system 31 includes a lens and a stop. The optical system 31 focuses an optical image of a subject on a light-receiving unit of the imager 32. The imager 32 includes a CCD (Charge Coupled Device) image sensor or a CMOS (Complementary Metal-Oxide Semiconductor) image sensor. The imager 32 converts the optical image of the subject focused on the light-receiving unit into an electric signal and supplies the electric signal of the image obtained by the conversion to the signal processing unit 33.

The signal processing unit 33 is constituted as substrate on which plural electronic components are provided, a system IC (Integrated Circuit), or the like. The signal processing unit 33 applies various kinds of signal processings to the electric signal of the image supplied from the imager 32 to generate image data. The signal processing unit 33 applies various kinds of signal processings to the image data. The RAM 34 includes a DRAM (Dynamic Random Access Memory) and temporarily stores the image data to be subjected to the signal processing in the signal processing unit 33.

The display unit 35 includes an LCD (Liquid Crystal Display) or an organic EL (Electro Luminescence) display. The display unit 35 displays various images according to the control by the signal processing unit 33.

The input unit 36 includes buttons, switches, or a touch panel provided superimposedly on the display unit 35. The input unit 36 supplies a signal corresponding to the operation by the user to the signal processing unit 33.

The signal processing unit 33 reads out image data from the medium 11 inserted in the digital camera 1 or causes the medium 11 to store (record) image data.

The signal processing unit 33 includes a camera-signal processing engine 51, a JPEG (Joint Photographic Experts Group) engine 52, an image-of-interest detecting engine 53, a number-of-pixels converting engine 54, an image display engine 55, a control CPU (Central Processing Unit) 56, an image signal bus 57, a control signal bus 58, an external media controller 59, an input interface 60, and a data bus 61.

The camera-signal processing engine 51, the JPEG engine 52, the image-of-interest detecting engine 53, the number-of-pixels converting engine 54, the image display engine 55, the control CPU 56, the data bus 61, and the RAM 34 are connected to one another by the image signal bus 57 through which an image signal, which is a signal of image data, is transmitted.

Each of the camera-signal processing engine 51, the JPEG engine 52, the image-of-interest detecting engine 53, the number-of-pixels converting engine 54, and the image display engine 55 supplies the image data to the RAM 34 through the image signal bus 57 and causes the RAM 34 to temporarily store the image data or reads out the image data temporarily stored in the RAM 34 from the RAM 34 through the image signal bus 57.

The camera-signal processing engine 51, the JPEG engine 52, the image-of-interest detecting engine 53, the number-of-pixels converting engine 54, the image display engine 55, and the control CPU 56 are connected to each other by the control signal bus 58 through which a control signal is transmitted.

The control CPU 56 acquires and supplies the control signal through the control signal bus 58 to control each of the camera-signal processing engine 51, the JPEG engine 52, the image-of-interest detecting engine 53, the number-of-pixels converting engine 54, and the image display engine 55.

The control CPU 56, the external media controller 59, and the input interface 60 are connected to one another by the data bus 61.

The control CPU 56 controls the external media controller 59 through the data bus 61 and causes the external media controller 59 to store the image data, which is supplied through the image signal bus 57 and the data bus 61, in the medium 11 or read out the image data stored in the medium 11 from the medium 11.

The camera-signal processing engine 51 applies, under the control by the control CPU 56 applied through the control signal bus 58, various kinds of signal processings to the electric signal of the image supplied from the imager 32 such as conversion into a digital signal, noise removal, and adjustment of a white balance. The camera-signal processing engine 51 causes the RAM 34 to temporarily store image data obtained by applying the signal processings to the electric signal.

The JPEG engine 52 reads out, under the control by the control CPU 56 applied through the control signal bus 58, the image data, which is supplied from the camera-signal processing engine 51 and temporarily stored in the RAM 34, from the RAM 34 and encodes the image data in the JPEG system. The JPEG engine 52 supplies the encoded image data to the external media controller 59 through the image signal bus 57 and the data bus 61. In this case, the external media controller 59 causes the medium 11 to store (record) the image data encoded in the JPEG system.

The JPEG engine 52 acquires, under the control by the control CPU 56 applied through the control signal bus 58, the image data encoded in the JPEG system, which is read out from the medium 11 by the external media controller 59, through the image signal bus 57 and the data bus 61 and decodes the image data encoded in the JPEG system. The JPEG engine 52 causes the RAM 34 to temporarily store the decoded image data.

The image-of-interest detecting engine 53 reads out, under the control by the control CPU 56 applied through the control signal bus 58, the image data temporarily stored in the RAM 34 from the RAM 34 through the image signal bus 57 and detects an image of interest included in images of the image data read out. That is, the image-of-interest detecting engine 53 detects an image of interest, which is an image to which attention is paid, among images included in images read out as the image data. The image of interest is an image of a person or an object to whom attention is paid (an object of interest) such as a person or a conspicuous subject.

In other words, the image-of-interest detecting engine 53 detects an image of interest, which is a conspicuous image or an image attracting people's attention, among the images included in the images of the image data.

More specifically, for example, the image-of-interest detecting engine 53 detects an image of a face as an image of interest. For example, the image-of-interest detecting engine 53 detects, as an image of interest, an image having a shape, a color, a size, or a pattern different from that of other images among the images included in the images of the image data.

Not only an image of a predetermined subject but also an image of a conspicuous area or an area attracting people's attention among the images may be detected as an image of interest. The user may directly designate an image of interest through the operation on the input unit 36.

The image-of-interest detecting engine 53 supplies data indicating a range of the image of interest in the images of the image data to the control CPU 56 through the image signal bus 57 or the control signal bus 58.

The number-of-pixels converting engine 54 reads out, under the control by the control CPU 56 applied through the control signal bus 58, the image data temporarily stored in the RAM 34 from the RAM 34 through the image signal bus 57 and applies processing for converting the number of pixels of the images to the image data. The number-of-pixels converting engine 54 supplies the image data of the images, the number of pixels of which is converted, to the RAM 34 through the image signal bus 57 and causes the RAM 34 to temporarily store the image data.

The image display engine 55 reads out, under the control by the control CPU 56 applied through the control signal bus 58, the image data temporarily stored in the RAM 34 from the RAM 34 through the image signal bus 57, generates image data corresponding to the image data read out and the display unit 35, and supplies the image data to the display unit 35 to cause the display unit 35 to display an image corresponding to the image data read out. The image display engine 55 causes, according to the control by the control CPU 56, the display unit 35 to display an image of a GUI (Graphical User Interface).

The control CPU 56 is a CPU of a built-in type or a CPU built in a system IC. The control CPU 56 executes a program stored in a ROM (Read Only Memory) or the RAM built in the digital camera 1 and acquires a control signal through the control signal bus 58 according to a signal from the input unit 36 corresponding to operation of the user supplied through the input interface 60 and the data bus 61. The control CPU 56 supplies the control signal to the camera-signal processing engine 51, the JPEG engine 52, the image-of-interest detecting engine 53, the number-of-pixels converting engine 54, the image display engine 55, the external media controller 59, and the input interface 60 through the control signal bus 58 to control the devices.

The external media controller 59 controls storage (recording) of various data including image data in the medium 11 which is inserted in the digital camera 1 and controls the readout of the various data stored (recorded) in the medium 11 inserted in the digital camera 1. When the medium 11 is a magnetic disk, an optical disk, or the like, a not-shown drive is provided. The external media controller 59 controls recording or readout of data in the medium 11 by the drive.

The input interface 60 receives a signal from the input unit 36 and shapes the received signal into a signal of a predetermined system to supply the signal from the input unit 36 to the control CPU 56 through the data bus 61.

FIG. 4 is a block diagram showing the structure of functional units realized by the control CPU 56 that executes a program. An image reading unit 71, a composition correcting unit 72, a number-of-pixels-conversion control unit 73, a display control unit 74, and a storage control unit 75 are realized by the control CPU 56 that executes the program.

The image reading unit 71 reads an original image to be subjected to correction of a composition, which is an taken image or an image stored in the medium 11 as image data.

The composition correcting unit 72 corrects a composition of the read original image. The composition correcting unit 72 slices an image having a preferable composition from the read original image.

The composition correcting unit 72 includes an image-of-interest center-of-gravity detecting unit 91, an overall-center-of-gravity calculating unit 92, a slicing-area determining unit 93, and an image slicing and generating unit 94.

The image-of-interest center-of-gravity detecting unit 91 detects the center of gravity of each of plural images of interest, which are images to which attention is paid, among images included in the read original image. The overallcenter-of-gravity calculating unit 92 calculates an overall center of gravity, which is the center of gravity of all the plural images of interest, from the center of gravity of each of the plural images of interest.

The slicing-area determining unit 93 determines an area of an image having a preferable composition in the original image on the basis of the overall center of gravity. More specifically, the slicing-area determining unit 93 determines an area in the original image such that a ratio of a distance from one edge of opposed edges of the area to the overall center of gravity to a distance from the other edge of the opposed edges of the area to the overall center of gravity takes a value decided in advance so as to arouse an aesthetic sense.

The image slicing and generating unit 94 slices an image of the determined area from the original image and generates a new image.

The composition correcting unit 72 supplies the generated new image, i.e., an image sliced in a preferable composition, to the number-of-pixels-conversion control unit 73.

The number-of-pixels-conversion control unit 73 causes the number-of-pixels converting engine 54 to convert the number of pixels of the image determined to be in the preferable composition into a predetermined number of pixels. For example, the number-of-pixels-conversion control unit 73 causes the number-of-pixels converting engine 54 to convert the number of pixels of the image determined to be in the preferable composition into the same number of pixels as that of the original image.

The display control unit 74 control the image display engine 55 to cause the display unit 35 to display the original image or the image which was determined to be in the preferable composition and whose number of pixels was converted.

The storage control unit 75 controls the external media controller 59 to cause the medium 11 to store the image data of the image which was determined to be in the preferable composition, and whose number of pixels was converted.

An example of the processing for correction of a composition will be explained with reference to a flowchart in FIG. 5. In step S11, the image reading unit 71 reads an original image to be subjected to correction of a composition.

For example, when the composition of a taken image is corrected, the image reading unit 71 stores image data supplied from the camera-signal processing engine 51 in a specific storage area for storing the original image to be subjected to correction of a composition among storage areas of the RAM 34 to thereby read the original image, which is the imaged image.

For example, when a composition of an image of the image data stored in the medium 11 is corrected, the image reading unit 71 causes the external media controller 59 to read out the image data stored in the medium 11 from the medium 11. When the image data read out is encoded in the JPEG system, the image reading unit 71 causes the JPEG engine 52 to decode the image data. The image reading unit 71 stores the image data read out from the medium 11 in this way in the specific storage area for storing the original image to be subjected to correction of a composition among storage areas of the RAM 34 to thereby read the original image.

In step S12, the display control unit 74 controls the image display engine 55 to cause the display unit 35 to display the original image.

Figure 6:
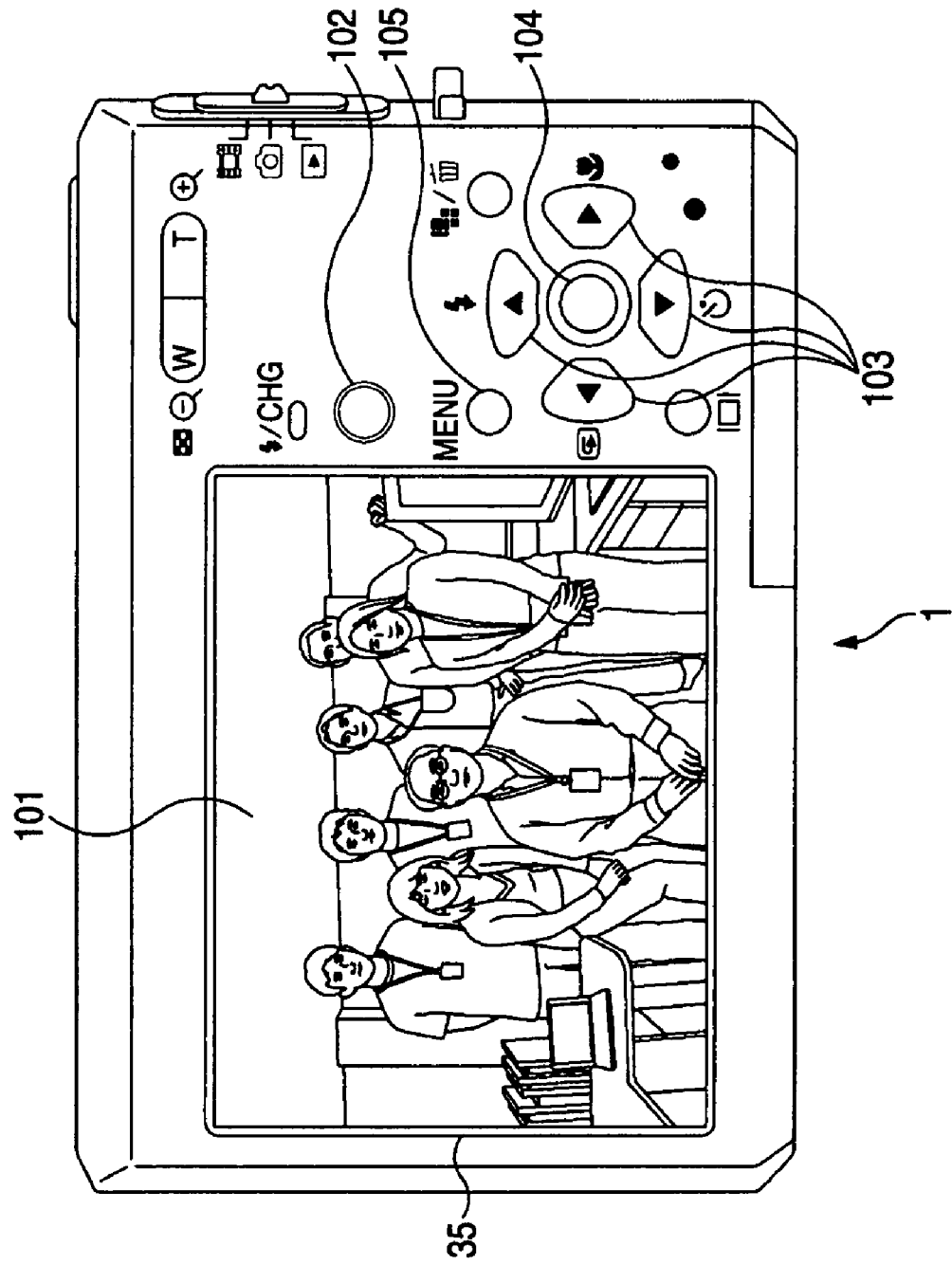
FIG. 6 is a diagram showing a display unit and an input unit of the digital camera.

As shown in FIG. 6, the display unit 35 of the digital camera 1 displays an original image 101.

As shown in FIG. 6, among the surfaces of the digital camera 1, on the surface of the digital camera 1 on which the display unit 35 is provided, a composition correction button 102, a cross button 103 including an upward button, a downward button, a rightward button, and a leftward button, a determination button 104, and a menu button 105 are arranged. The composition correction button 102, the cross button 103, the determination button 104, and the menu button 105 constitute the input unit 36.

In step S13, the composition correcting unit 72 judges, on the basis of a signal supplied from the input unit 36 through the input interface 60 and the data bus 61 according to operation of the user, whether the composition correction button 102 is depressed by the user and correction of a composition of the original image 101 is instructed.

When it is judged in step S13 that the composition correction button 102 is depressed by the user and correction of the composition of the original image 101 is instructed, the processing proceeds to step S14. The image-of-interest center-of-gravity detecting unit 91 of the composition correcting unit 72 detects the center of gravity and a degree of interest for each of plural images of interest on the original image 101.

The degree of interest is a value indicating a degree of conspicuousness or a degree of attracting people's attention of an image of interest.

Step S14 will be explained more in detail. The image-of-interest center-of-gravity detecting unit 91 causes the image-of-interest detecting engine 53 to detect an image of interest included in the original image 101 and supply data indicating a range of the image of interest and a characteristic amount of the image of interest in the original image 101 to the control CPU 56 through the image signal bus 57 or the control signal bus 58.

For example, when an image of a face is detected as an image of interest, the image-of-interest detecting engine 53 detects pixels of a hue in a predetermined range of a skin color among pixels of the original image 101 and specifies an image of an area of a predetermined size or more in an area in which the pixels are arranged. Moreover, the image-of-interest detecting engine 53 judges whether an image of eyes and an image of a mouth are included in the specified image to thereby judge whether the image is an image of a face.

The image-of-interest detecting engine 53 supplies data indicating a range of the image of interest, which is the image of the face detected in this way, to the control CPU 56.

For example, in this case, the image-of-interest detecting engine 53 supplies data indicating a size of the image of the face to the control CPU 56 as a characteristic amount of the image of interest.

Figure 7:
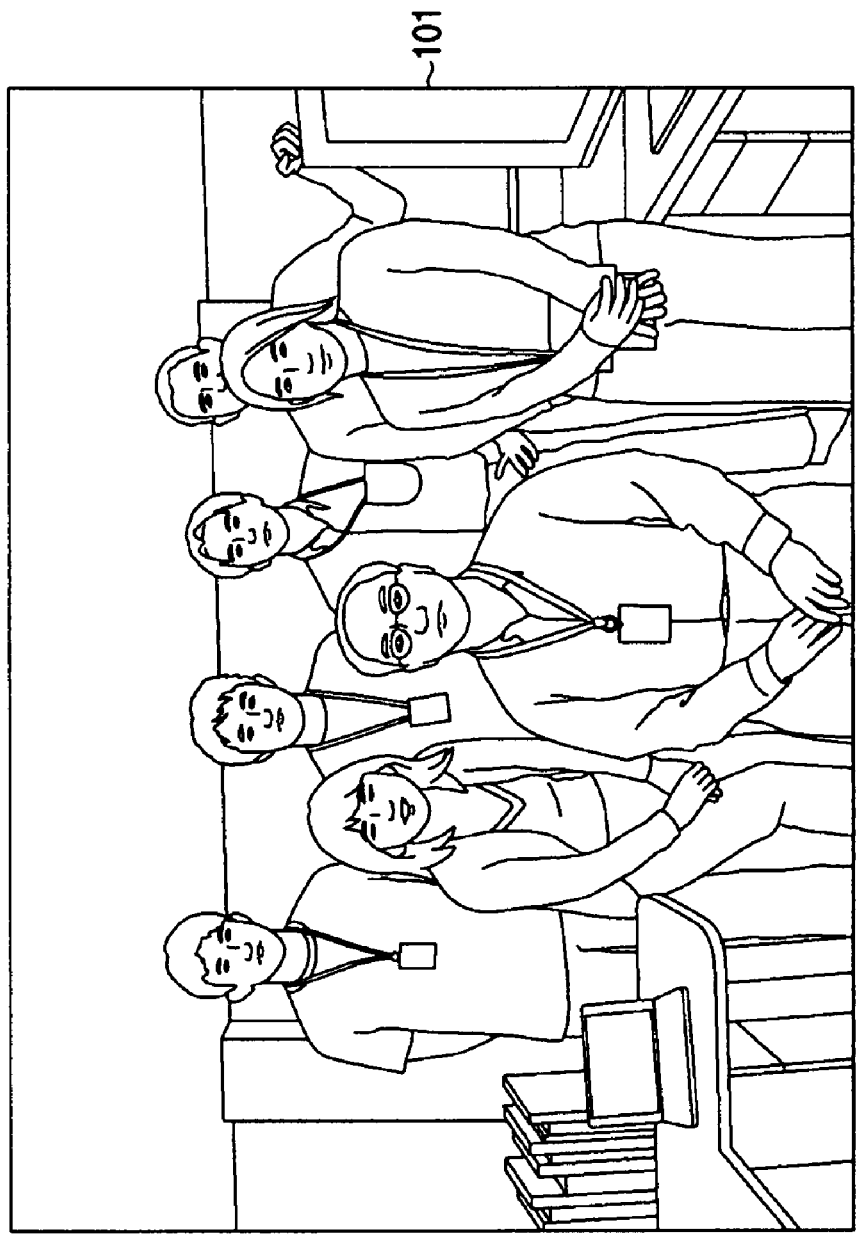
FIG. 7 is a diagram showing an example of an original image.
Figure 8:
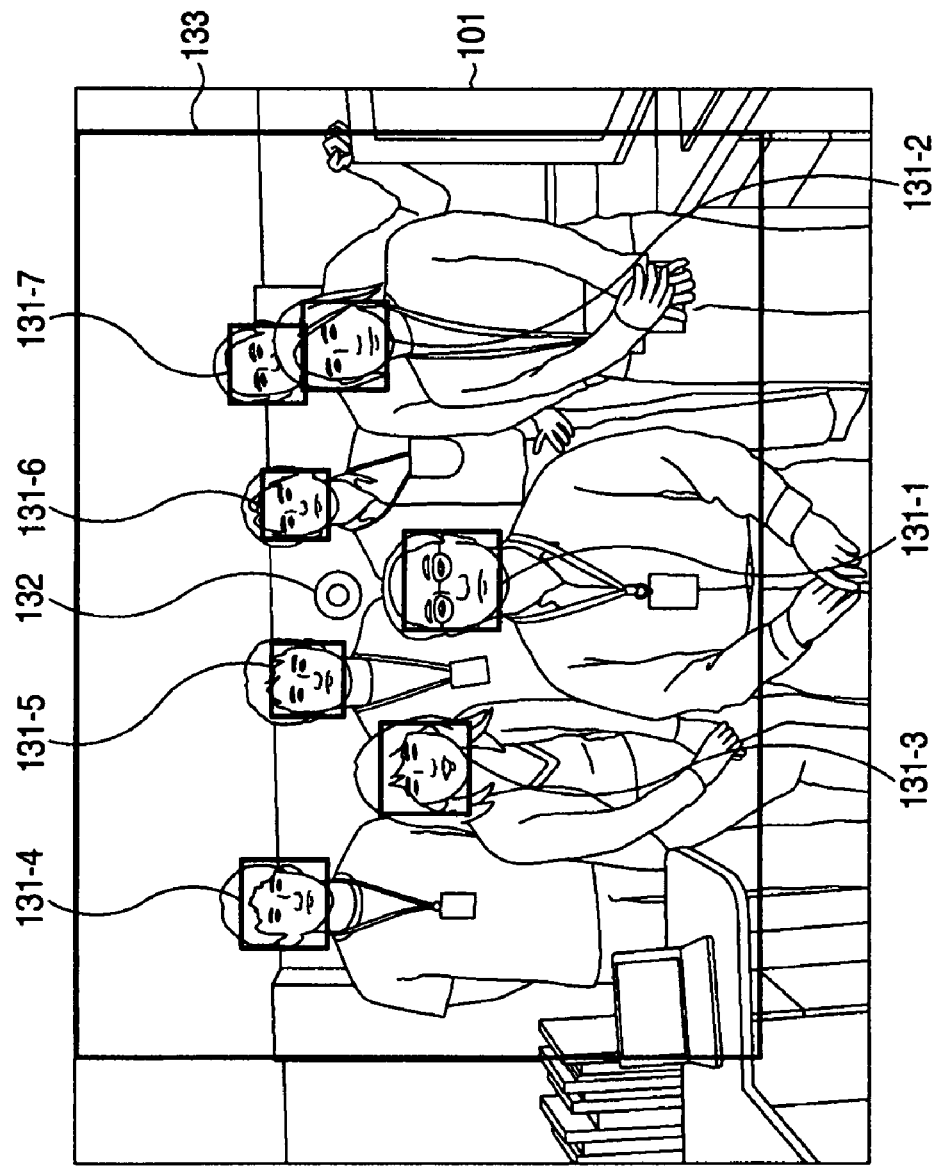
FIG. 8 is a diagram showing an example of the original image, an image of interest, an overall center of gravity, and an area to be sliced.

For example, when images of seven people are included in the original image 101 as shown in FIG. 7, images of interest 131-1 to 131-7, which are images of the faces of the seven people included in the original image 101, are detected as shown in FIG. 8. For example, when the images of interest 131-1 to 131-7, which are images of faces in square ranges, are detected as shown in FIG. 8, data indicating the square ranges and sizes of the images of interest 131-7 to 131-7 is supplied to the control CPU 56.

For example, when an image of interest, which is an image having a shape, a color, a size, or a pattern different from that of other images, among the images included in the original image 101 is detected, the image-of-interest center-of-gravity detecting unit 91 causes the image-of-interest detecting engine 53 to detect outlines of the images included in the original image 10 and detect a characteristic amount indicating characteristics such as a shape, a color, a size, and a pattern for each of the images, the outlines of which are detected. The image-of-interest detecting engine 53 detects an image of interest, which is a more characteristic image, on the basis of the characteristic amount of each of the images.

For example, the image-of-interest detecting engine 53 compares the detected characteristic amounts and a threshold decided in advance and detects an image having the characteristic amount equal to or larger (or smaller) than the threshold as an image of interest.

The image-of-interest detecting engine 53 supplies data indicating a range of the image of interest detected in this way to the control CPU 56.

In this case, the image-of-interest detecting engine 53 supplies data indicating the characteristic amount of the image of interest or data corresponding to the characteristic amount such as data indicating a value obtained by normalizing the characteristic amount to the control CPU 56.

The image-of-interest center-of-gravity detecting unit 91 calculates the center of gravity for each of the plural images of interest on the original image 101 from the data indicating the range of the image of interest in the original image 101 supplied from the image-of-interest detecting engine 53 to thereby detect the center of gravity of the image of interest. The image-of-interest center-of-gravity detecting unit 91 calculates data indicating a degree of interest of the image of interest from the data indicating the characteristic amount of the image of interest supplied from the image-of-interest detecting engine 53 to thereby detect a degree of interest of the image of interest.

For example, when the images of interest 131-1 to 131-7 shown in FIG. 8, which are the images of faces in the square ranges, are detected, the center of gravity corresponding to a position in the center of the square range of each of the images of interest 131-1 to 131-7 is detected for each of the images of interest 131-1 to 131-7.

A degree of interest is detected for each of the images of interest 131-1 to 131-7.

For example, an equal degree of interest (of the same value), which satisfies a relation of Equation (3) below, is detected for each of the images of interest 131-1 to 131-7.

Further, a degree of interest of a different value is detected for each of the images of interest 131-1 to 131-7. More specifically, a degree of interest corresponding to a size of the square range of each of the images of interest 131-1 to 131-7 is detected for each of the image of interest 131-1 to 131-7. In this case, a degree of interest of a larger value indicating that an image of interest is more conspicuous is detected in order from the image of interest 131-1 to the image of interest 131-7.

The image-of-interest detecting engine 53 may detect the center of gravity and a degree of interest of each of the images of interest.

Referring back to FIG. 5, in step S15, the overall-center-of-gravity calculating unit 92 of the composition correcting unit 72 calculates an overall center of gravity, which is the center of gravity of all the plural images of interest, from the center of gravity of each of the plural images of interest by weighting the center of gravity with the detected degree of interest.

When there are N images of interest in total, a position of the center of gravity of each of the images of interest on a coordinate of the original image 101 is represented by $(x_k, y_k)$ (k=1, 2, ..., N), and a degree of interest of each image of interest is represented by $w_k$, a coordinate value $x_c$ on an x coordinate and a coordinate value $y_c$ on a y coordinate of a position $(x_c, y_c)$ of an overall center of gravity are calculated by Equation (1) and Equation (2). The degree of interest $w_k$ in Equation (1) and Equation (2) satisfies a condition indicated by Equation (3).

$$x_c = \frac{1}{N}\sum_{k=1}^{N} w_k x_k \quad (1)$$

$$y_c = \frac{1}{N}\sum_{k=1}^{N} w_k y_k \quad (2)$$

$$\sum_{k=1}^{N} w_k = N \quad (3)$$

In the example shown in FIG. 8, the position $(x_c, y_c)$ of an overall center of gravity 132 is calculated from the center of gravity and the degree of interest for each of the images of interest 131-1 to 131-7, which are the images of the faces.

In step S14, a position (e.g., a range) and a degree of interest of each of the images of interest may be detected, and in step S15, the overall center of gravity 132 may be calculated from the position and the degree of interest of each of the images of interest.

In step S16, the slicing-area determining unit 93 of the composition correcting unit 72 determines an area to be sliced from the original image 101 such that the overall center of gravity 132 is placed in a position determined in advance in the area. More specifically, in step S16, the slicing-area determining unit 93 determines an area to be sliced in the original image 101 such that a ratio of a distance from one edge of opposed edges of the area to be sliced to the overall center of gravity 132 to a distance from the other edge of the opposed edges of the area to be sliced to the overall center of gravity 132 takes a value decided in advance so as to arouse an aesthetic sense.

For example, as shown in FIG. 8, an area to be sliced 133 is determined on the basis of the overall center of gravity 132.

Figure 9:
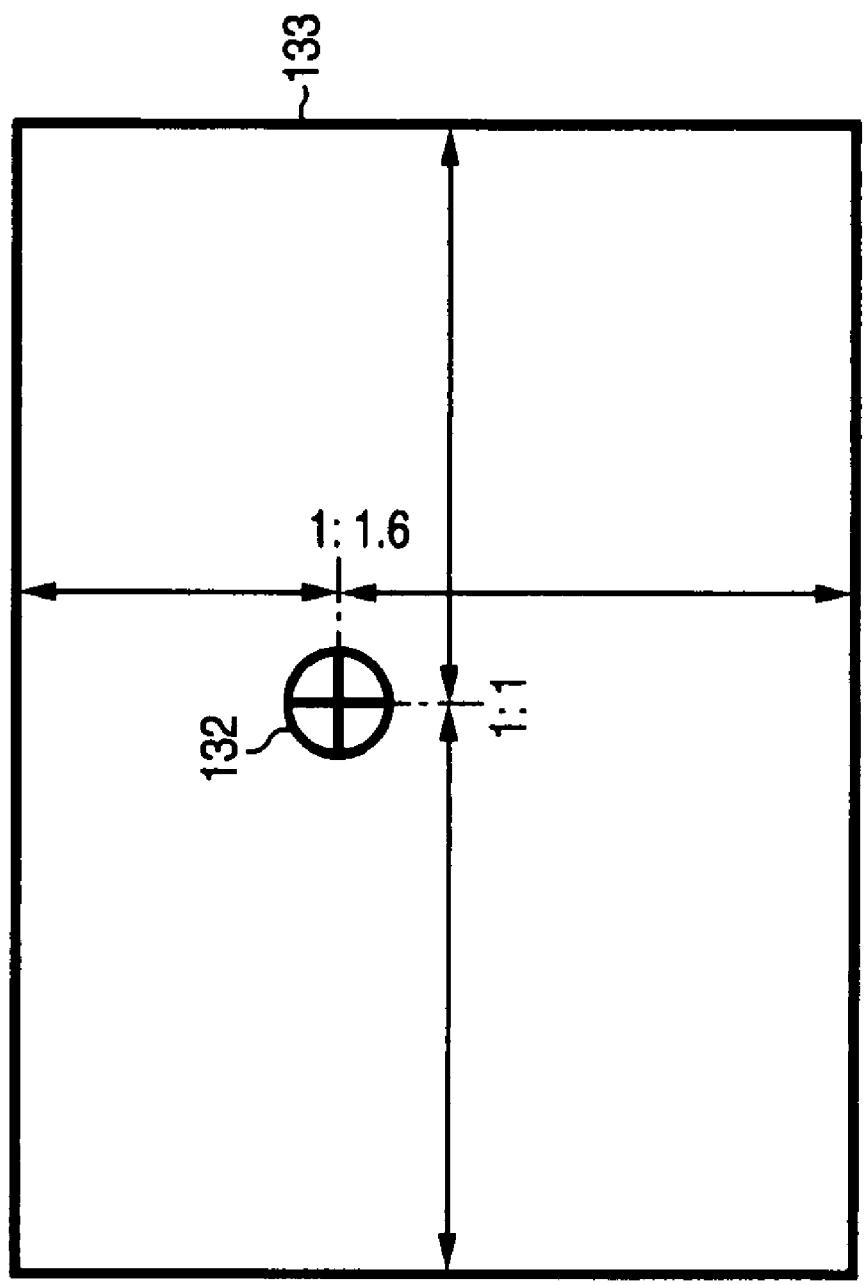
FIG. 9 is a diagram for explaining the area to be sliced.

To explain more in detail, as shown in FIG. 9, the slicing-area determining unit 93 determines the area to be sliced 133 of a rectangular shape such that a position in a horizontal direction of the overall center of gravity 132 coincides with the center in the horizontal direction of the area 133 and a position in a vertical direction of the overall center of gravity 132 is in a position of 1/2.6 from the upper end of the area 133. In other words, the slicing-area determining unit 93 determines the area to be sliced 133 such that the vertical direction of the area 133 is divided at the golden ratio of about 1:1.618 by the overall center of gravity 132, an aspect ratio of the area 133 is identical with an aspect ratio of the original image 101, and a size of the area 133 is the largest.

In other words, the slicing-area determining unit 93 determines the rectangular area 133 such that a ratio of a distance from an edge on the left side of the rectangular area 133 to the overall center of gravity 132 to a distance from an edge on the right side thereof to the overall center of gravity 132 is 1:1, a ratio of a distance from an edge on the upper side of the rectangular area 133 to the overall center of gravity 132 to a distance from an edge on the lower side thereof to the overall center of gravity 132 is the golden ratio of 1:1.618, and the rectangular area 133 has an aspect ratio same as the aspect ratio of the original image 101 and has a largest size in the range of the original image 101.

Figure 10:
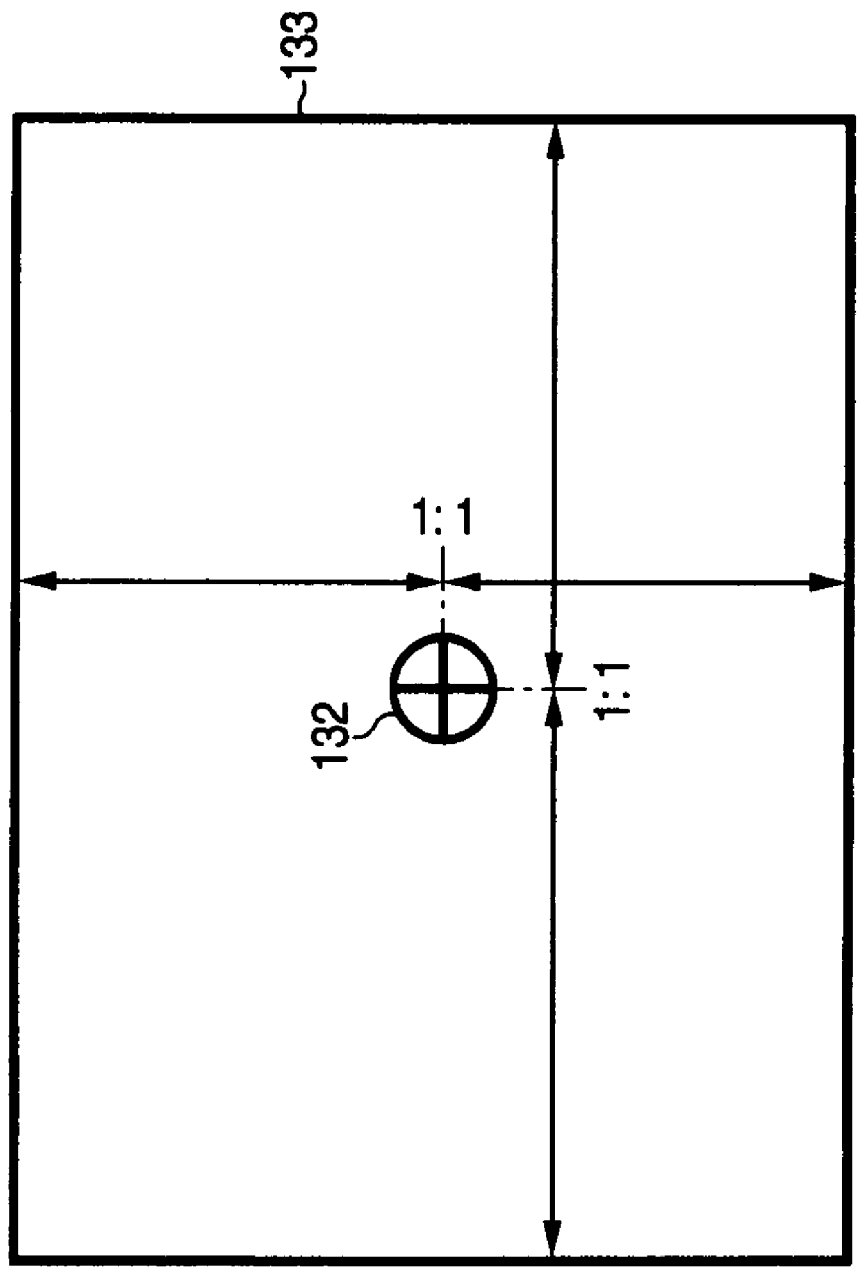
FIG. 10 is a diagram for explaining the area to be sliced.
Figure 11:
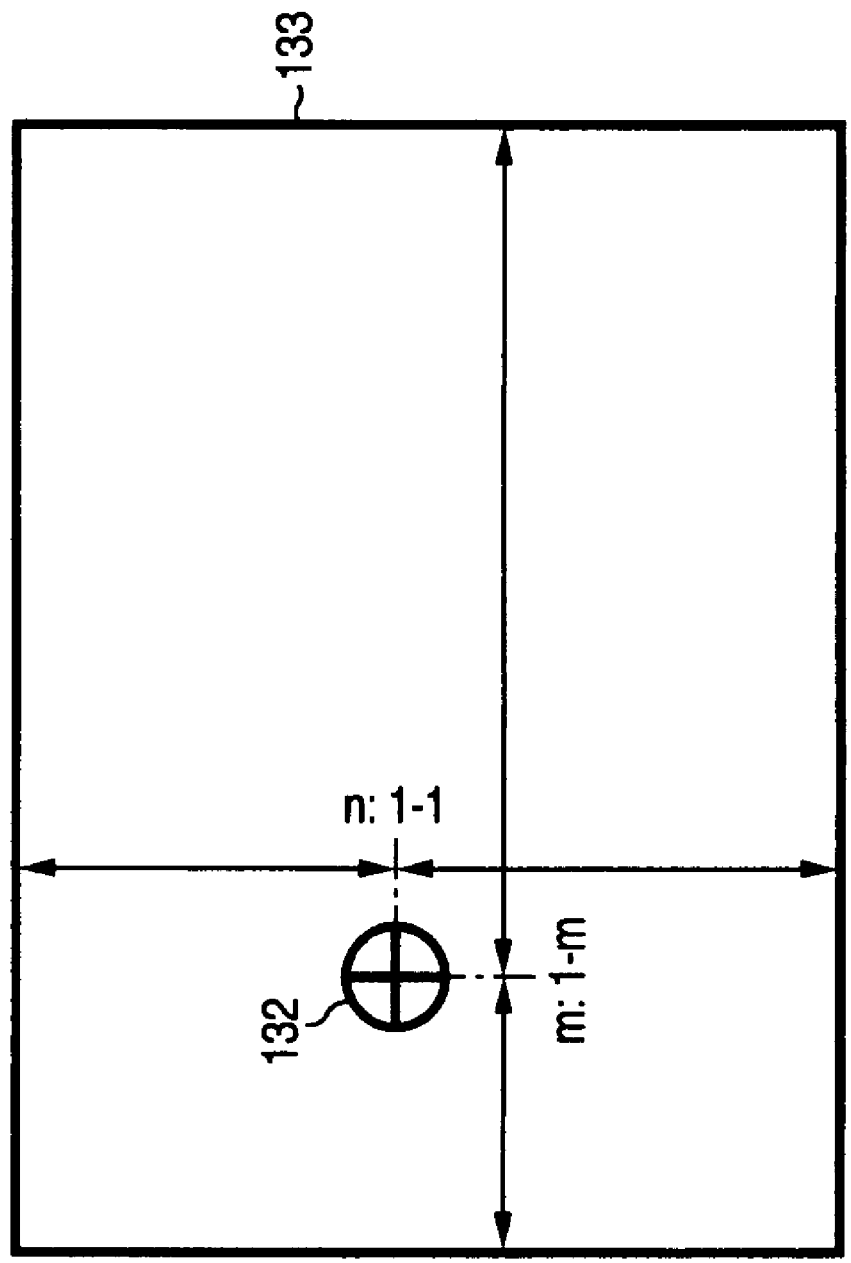
FIG. 11 is a diagram for explaining the area to be sliced.

As shown in FIG. 10, the area to be sliced 133 may be determined such that the overall center of gravity 132 is in the center of the area 133. As shown in FIG. 11, the area to be sliced 133 may be determined such that a position in the horizontal direction of the overall center of gravity 132 in the area 133 is at m:1−m ($0 \leq m \leq 1$) decided in advance with the edge on the let side of the area 133 as a reference and a position in the vertical direction of the overall center of gravity 132 in the area 133 is at n:1−n (0≦n≦1) decided in advance with the edge on the upper side of the area 133 as a reference.

Figure 12:
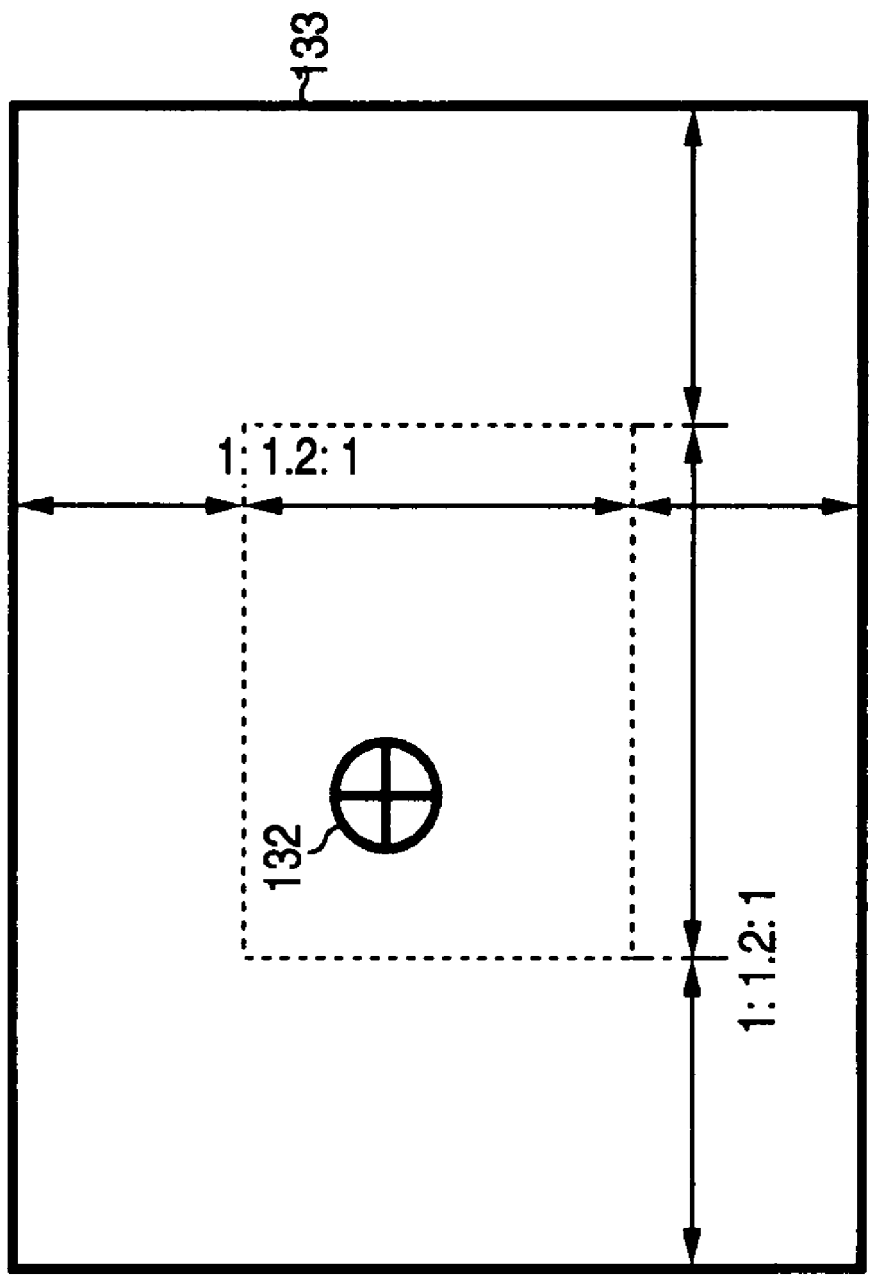
FIG. 12 is a diagram for explaining the area to be sliced.

Moreover, as shown in FIG. 12, the area to be sliced 133 may be determined such that the overall center of gravity 132 fits in a center area (an area indicated by a dotted line in FIG. 12) of areas obtained by dividing the area 133 at a ratio of division in the horizontal direction of 1:1.2:1 and at a ratio of division in the vertical direction of 1:1.2:1. In other words, the area to be sliced 133 may be determined such that a ratio of a distance from one edge of vertically or horizontally opposed edges of the rectangular area 133 to the overall center of gravity 132 to a distance from the other edge to the overall center of gravity 132 takes any value from 1:1 to 1:2.2.

In this case, a composition of an image included in the area to be sliced 133 is desirable. For example, it can be said that a composition of an image included in the area 133 when the overall center of gravity 132 is located in the center of the area 133 is satisfactory compared with a composition of an image included in a predetermined area in which the overall center of gravity 132 is in a position outside a center area of areas obtained by dividing the predetermined area at a ratio of division in the horizontal direction of 1:1.2:1 and at a ratio of division in the vertical direction of 1:1.2:1. This is because an image of interest is too close to an edge in the image included in the predetermined area in which the overall center of gravity 132 is in a position outside a center area of areas obtained by dividing the predetermined area at a ratio of division in the horizontal direction of 1:1.2:1 and at a ratio of division in the vertical direction of 1:1.2:1.

In particular, when the area to be sliced 133 is determined such that a ratio of a distance from one edge of the vertically or horizontally opposed edges of the rectangular area 133 to the overall center of gravity 132 to a distance from the other edge to the overall center of gravity 132 takes a value 1:2, a so-called three-equally-divided composition is formed. A composition of an image of the area to be sliced 133 is satisfactory.

However, when the ratio exceeds 1:2.2, the composition becomes unpleasant.

Referring back to FIG. 5, in step S17, the composition correcting unit 72 judges whether all the images of interest are included in the determined area 133. For example, in step S17, the composition correcting unit 72 judges whether all the images of interest 131-1 to 131-7, which are the images of the faces, are included in the area to be sliced 133.

When it is judged in step S17 that all the images of interest are not included in the determined area 133, it is not desirable to slice an image not including all the images of interest, and therefore the processing returns to step S16 and the processing described above is repeated. In this case, in step S16, the slicing-area determining unit 93 determines an area to be sliced in the original image 101 such that a ratio of a distance from one edge of opposed edges of the area to be sliced to the overall center of gravity 132 to a distance from the other edge of the opposed edges of the area to be sliced to the overall center of gravity 132 takes a value decided in advance so as to arouse an aesthetic sense, which is different from the last value in step S16.

Consequently, it is possible to determine the area to be sliced 133 including all the images of interest.

When it is judged in step S17 that all the images of interest are included in the determined area 133, the processing proceeds to step S18, where the image slicing and generating unit 94 of the composition correcting unit 72 slices an image of the determined area 133 from the original image 101 and generates an image after slicing. The generated image after slicing is stored in the RAM 34 as image data.

Figure 13:
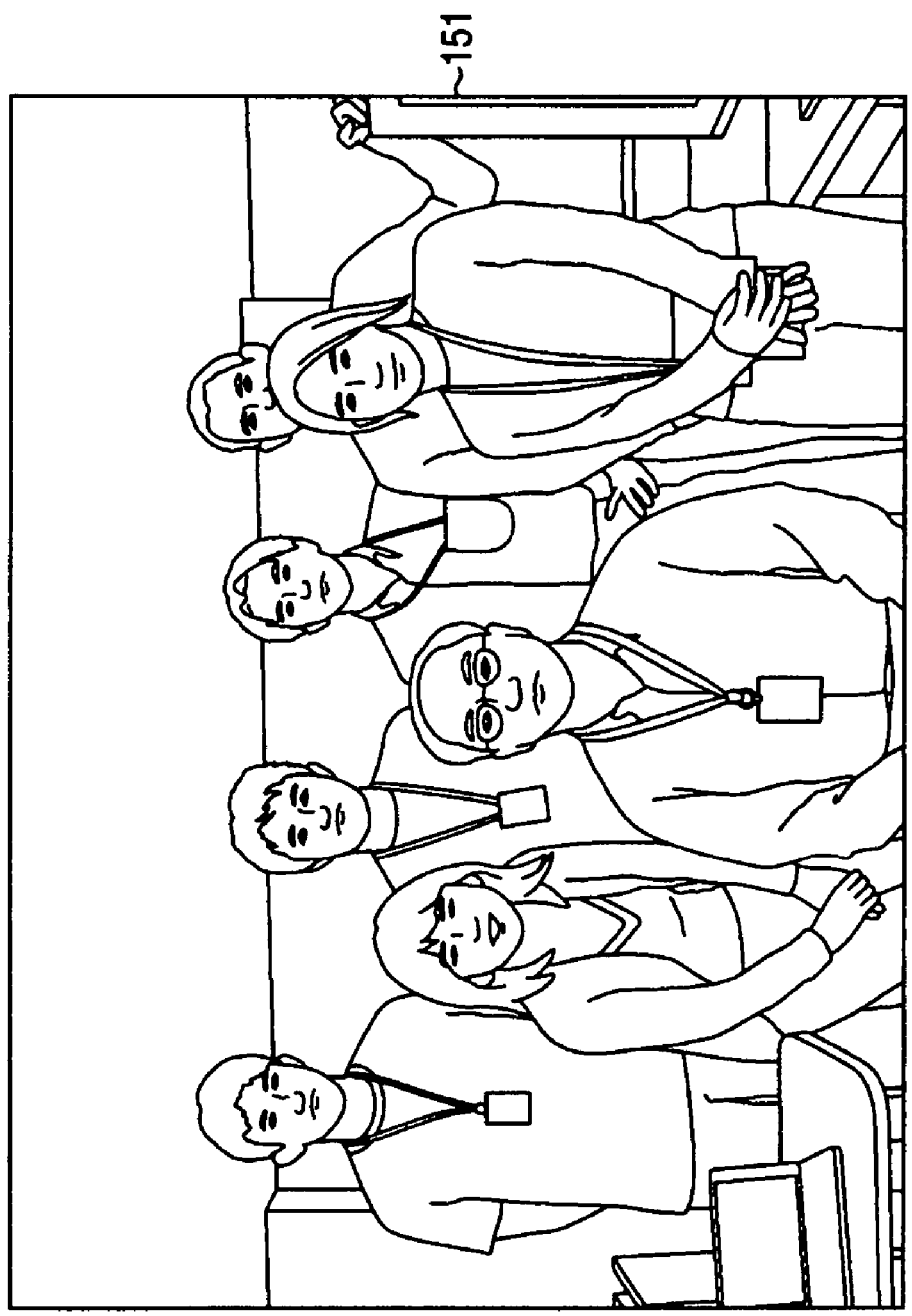
FIG. 13 is a diagram showing an example of an image after slicing.

For example, as shown in FIG. 8, when the center of gravity and a degree of interest are detected for each of the images of interest 131-1 to 131-7, which are the images of the faces, on the original image 101, a position of the overall center of gravity 132 is calculated, and the area to be sliced 133 is determined, in step S18, the image slicing and generating unit 94 slices an image of the area to be sliced 133 from the original image 101 and generates an image after slicing 151 as shown in FIG. 13.

In step S19, the number-of-pixels-conversion control unit 73 causes the number-of-pixels converting engine 54 to convert the number of pixels of the image after slicing 151 having a preferable composition into the number of pixels same as that of the original image 101. In this case, the number-of-pixels converting engine 54 converts a size and the number of pixels in each of the length and the width of the image after slicing 151 to be the same as a size and the number of pixels in each of the length and the width of the original image 101.

The number-of-pixels-conversion control unit 73 may cause the number-of-pixels converting engine 54 to convert the number of pixels of the image after slicing 151 formed in the preferable composition into an arbitrary number of pixels decided in advance.

The number-of-pixels-conversion control unit 73 may cause the number-of-pixels converting engine 54 to convert the number of pixels of the image after slicing 151 formed in the preferable composition into the number of pixels designated in advance by the user.

Figure 14:
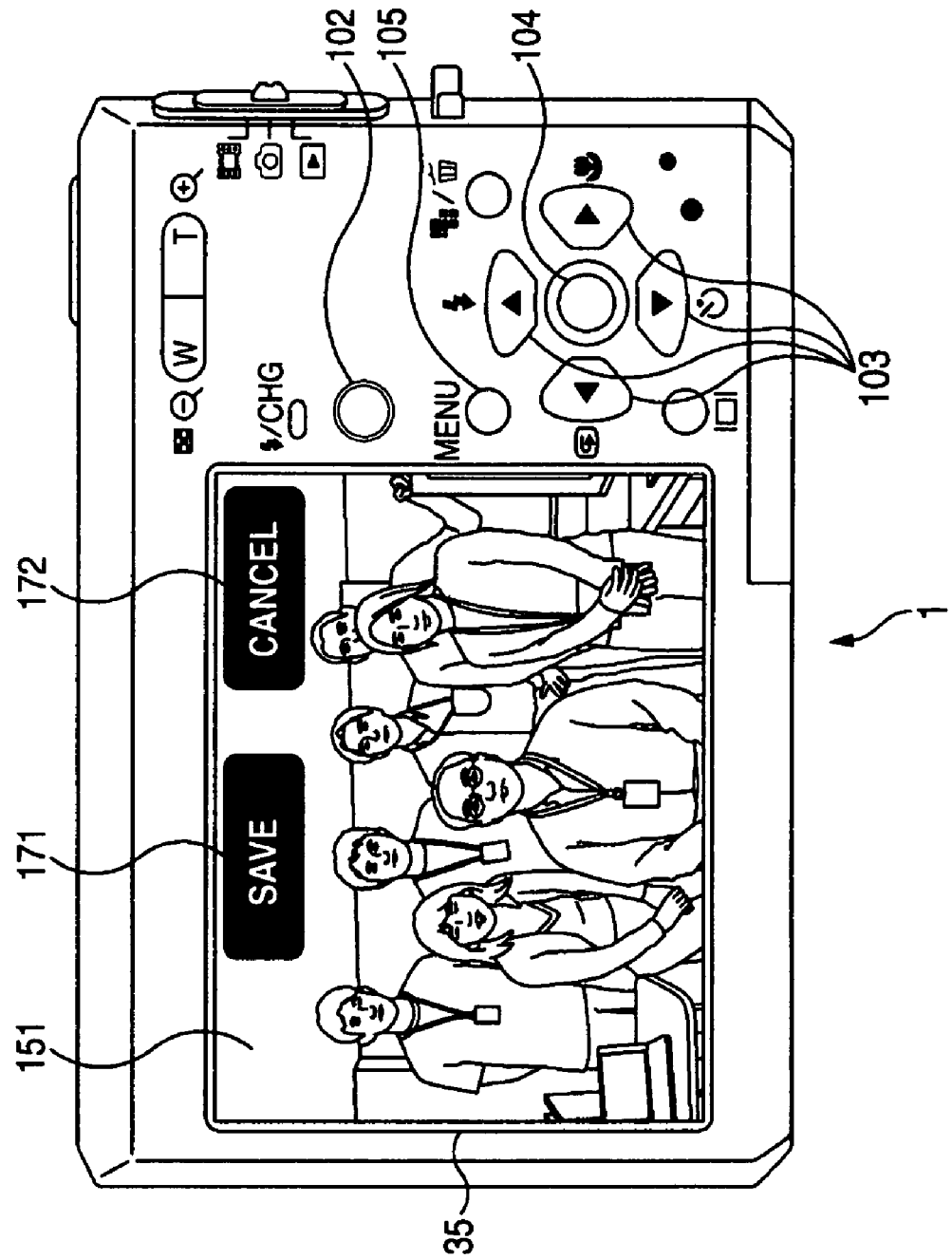
FIG. 14 is a diagram showing the display unit and the input unit of the digital camera.

In step S20, the display control unit 74 controls the image display engine 55 to cause the display unit 35 to display the image after slicing 151. For example, as shown in FIG. 14, the image after slicing 151 is displayed on the display unit 35 of the digital camera 1.

In this case, the display control unit 74 controls the image display engine 55 to cause the display unit 35 to display, together with the image after slicing 151, a button 171 for instructing saving of the image after slicing 151 and a button 172 for instructing cancellation of the saving of the image after slicing 151 (discarding of the image after slicing 151).

When the user looks at the image after slicing 151 displayed on the display unit 35 and likes the image after slicing 151, the user operates the button 171. When the user does not like the image after slicing 151, the user operates the button 172.

In step S21, the storage control unit 75 judges, on the basis of a signal supplied from the input unit 36 through the input interface 60 and the data bus 61 according to the operation of the user, whether saving of the image after slicing 151 is instructed.

For example, in step S21, when a position where the button 171 is displayed in an area of the touch panel provided to be superimposed on the display unit 35 is tapped or when the button 171 is focused by the cross button 103 and the determination button 104 is depressed to operate the button 171, the storage control unit 75 judges that saving of the image after slicing 151 is instructed. For example, in step S21, when a position where the button 172 is displayed in the area of the touch panel provided to be superimposed on the display unit 35 is tapped or when the button 172 is focused by the cross button 103 and the determination button 104 is depressed to operate the button 172, the storage control unit 75 judges that cancellation of saving of the image after slicing 151 (discarding of the image after slicing 151) is instructed and saving of the image after slicing 151 is not instructed.

When it is judged in step S21 that saving of the image after slicing 151 is instructed, the processing proceeds to step S22. The storage control unit 75 controls the external media controller 59 to cause the medium 11 to store image data of the image after slicing 151, which was determined to be in a preferable composition whose number of pixels was converted, and which is stored in the RAM 34. Here, the processing ends.

The image after slicing 151 may be encoded in the JPEG system by the JPEG engine 52 and then stored in the medium 11 as image data.

On the other hand, when it is judged in step S21 that saving of the image after slicing 151 is not instructed, the processing skips step S22 and directly ends without causing the medium 11 to store the image data of the image after slicing 151.

When it is judged in step S13 that correction of the composition of the original image 101 is not instructed, since it is unnecessary to correct the composition, the processing ends skipping steps S14 to S22.

In this way, it is possible to easily obtain the image after slicing 151 formed in the preferable composition, which is obtained by correcting the composition of the original image 101, and save the image after slicing 151.

Figure 15:
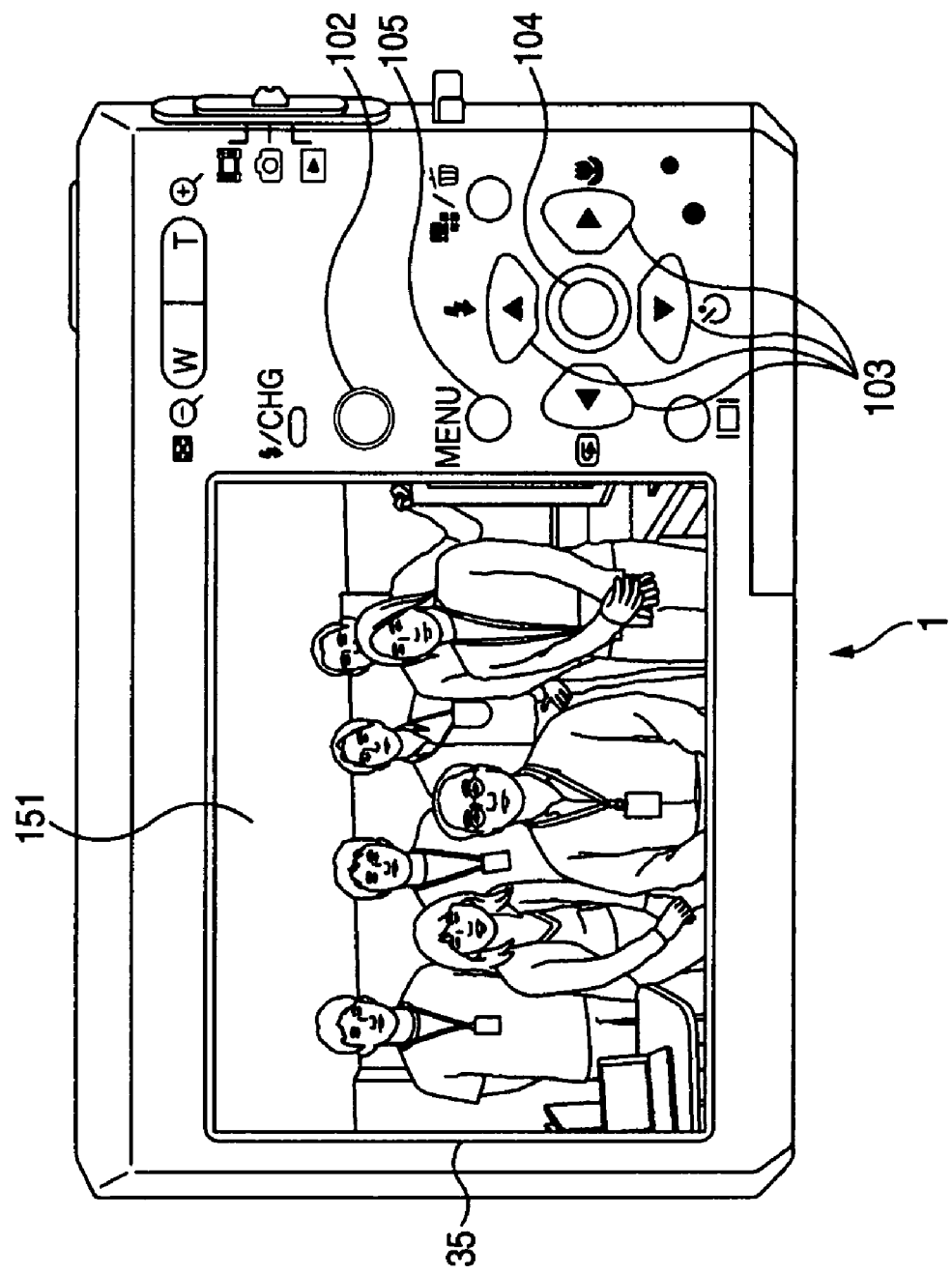
FIG. 15 is a diagram showing the display unit and the input unit of the digital camera.

By saving the image after slicing 151, as shown in FIG. 15, like the original image 101, it is possible to arbitrarily cause the display unit 35 to display a desired image after slicing 151. The user can arbitrarily view the image after slicing 151.

The image data of the image after slicing 151 sliced from the determined area 133 of the original image 101 may be directly stored in the medium 11 without converting the number of pixels of the image after slicing 151.

Figure 16:
FIG. 16 is a diagram showing an example of an original image.
Figure 17:
FIG. 17 is a diagram showing an example of an image after slicing.
Figure 18:
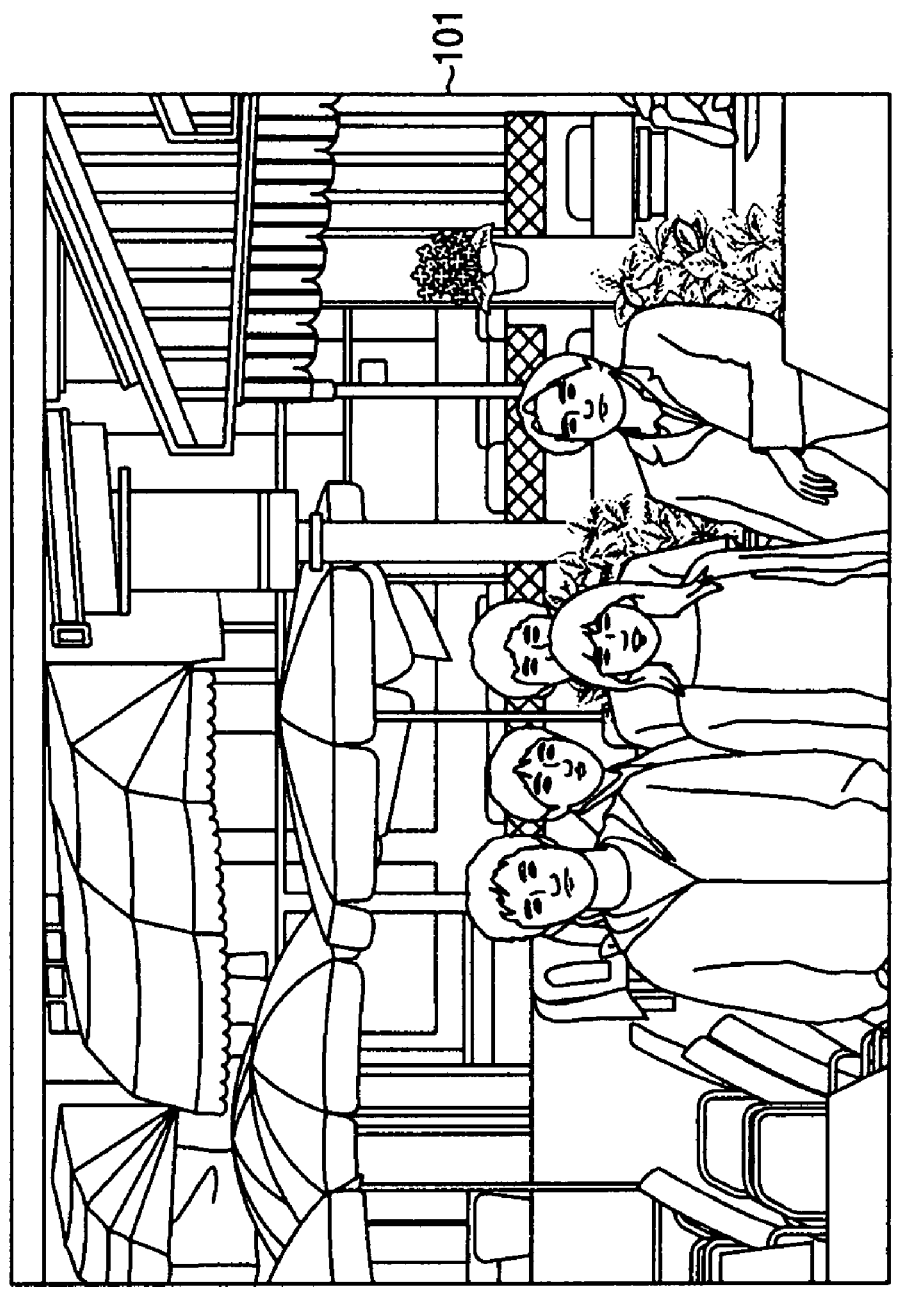
FIG. 18 is a diagram showing an example of an original image.
Figure 19:
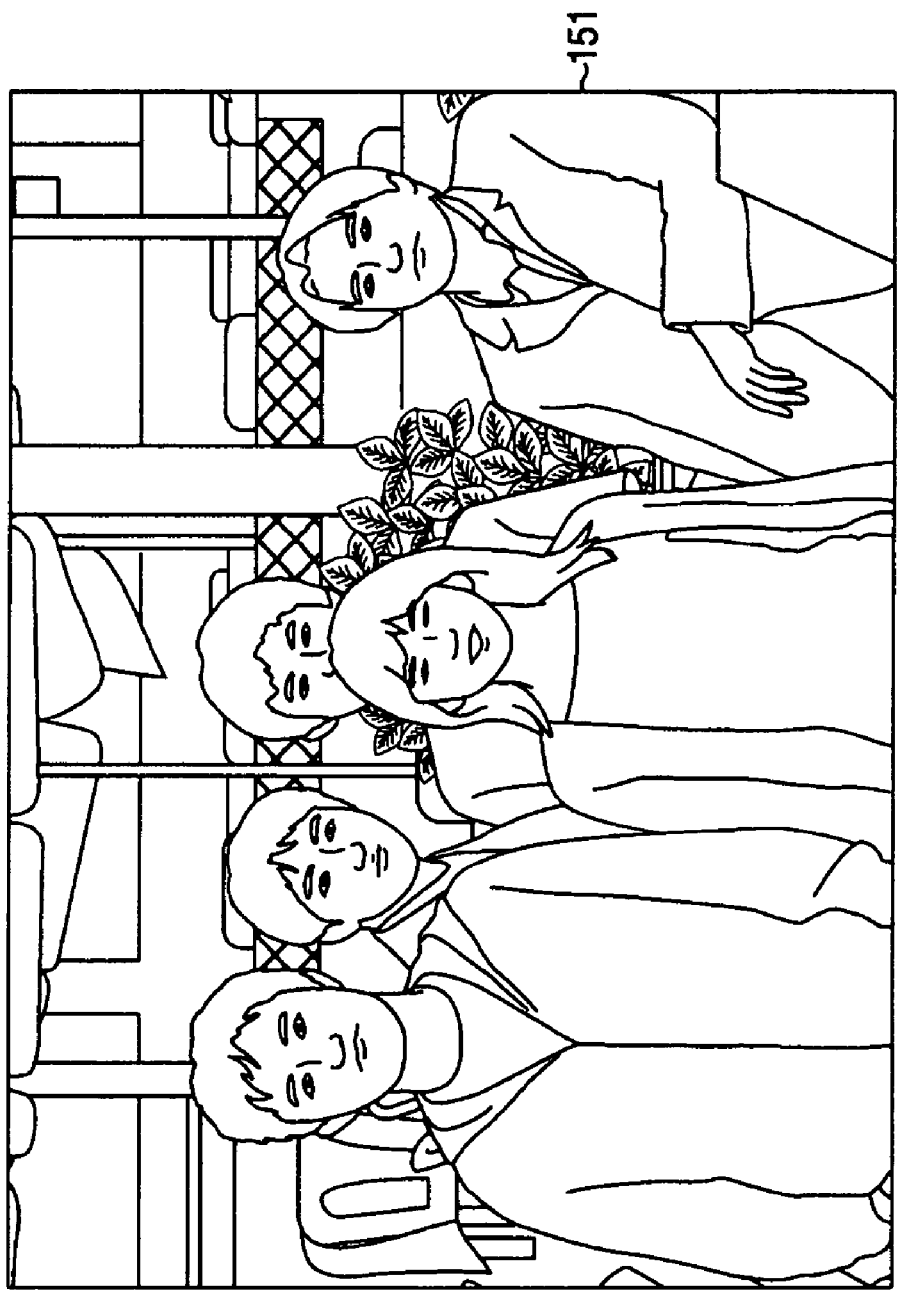
FIG. 19 is a diagram showing an example of an image after slicing.

FIG. 16 is a diagram showing another example of the original image 101. FIG. 17 is a diagram showing another example of the image after slicing 151 generated from the original image 101 in FIG. 16 by the processing for correction of a composition explained with reference to the flowchart in FIG. 5. FIG. 18 is a diagram showing still another example of the original image 101. FIG. 19 is a diagram showing still another example of the image after slicing 151 generated from the original image 101 in FIG. 18 by the processing for correction of a composition explained with reference to the flowchart in FIG. 5.

As shown in FIGS. 16 to 19, it is possible to easily slice the image after slicing 151 formed in the preferred composition from the original image 101 formed in an unsatisfactory composition.

In the past, a photograph (the original image 101) regarded as a "failed photograph" because of a "poor composition" is often deleted. However, if the photograph (the original image 101) is sliced again to be formed in a "satisfactory composition", the photograph taken with much effort does not have to be discarded.

A composition of an imaged photograph can be corrected to a "satisfactory composition" not only immediately after imaging but also any time after imaging without performing complicated selection and operation. Therefore, it is unnecessary to be careful about a composition at the time of imaging and it is possible to take photographs at ease.

After determining the area 133 for the original image 101, the image of the determined area 133 may be displayed on the display unit 35 without slicing the image of the area 133. Consequently, it is possible to display the original image 101 as an image having a satisfactory composition and allow the user to view the image without increasing image data.

It is also possible to collectively correct compositions of plural original images 101 stored in the medium 11 as image data.

Figure 20:
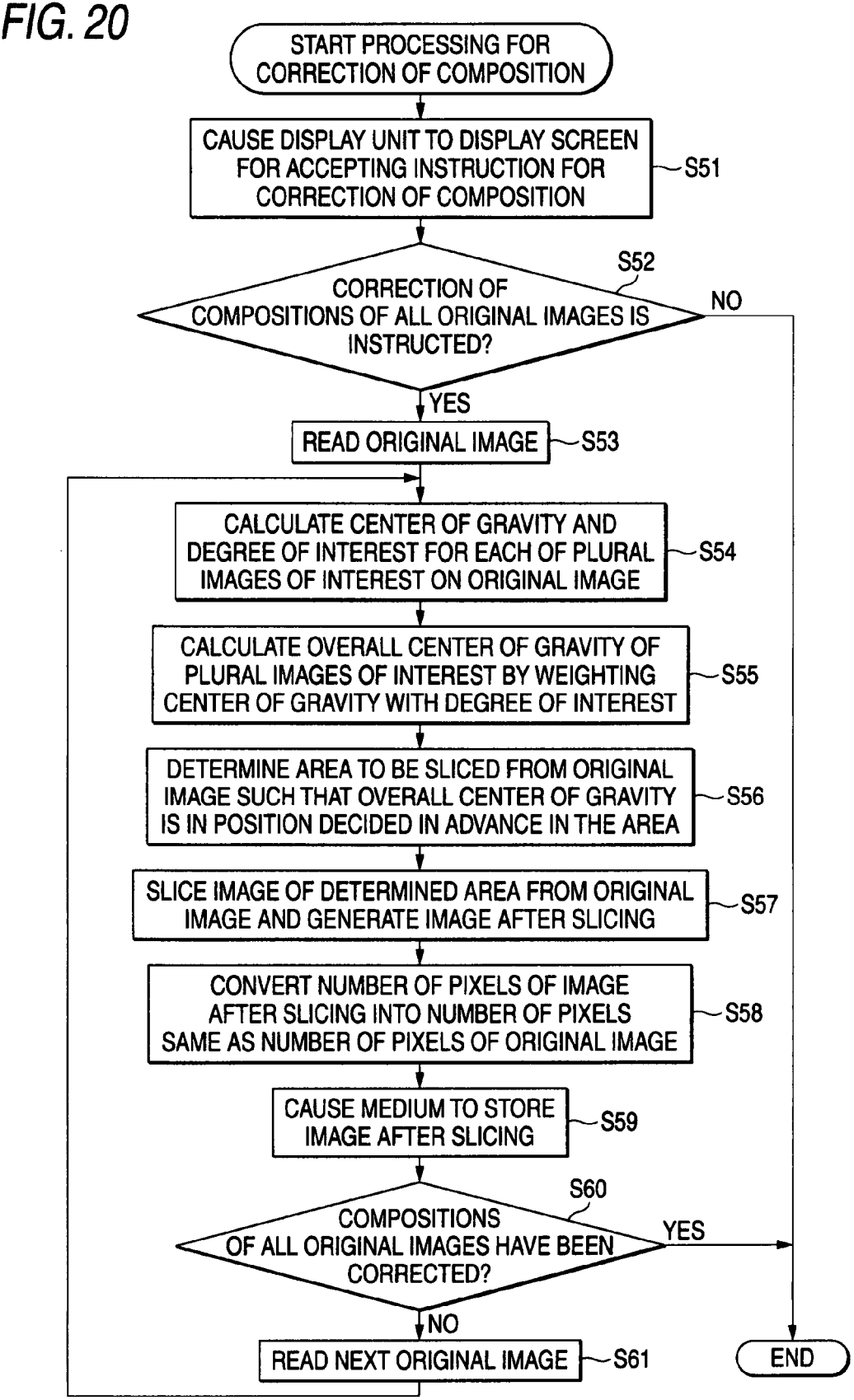
FIG. 20 is a flowchart for explaining another example of the processing for correction of a composition.

FIG. 20 is a flowchart for explaining another example of the processing for correction of a composition that is executed when commands of menus displayed by depression of the menu button 105 are selected. The processing is for correction of a composition when compositions of plural original images 101 stored in the medium 11 as image data are collectively corrected.

Figure 21:
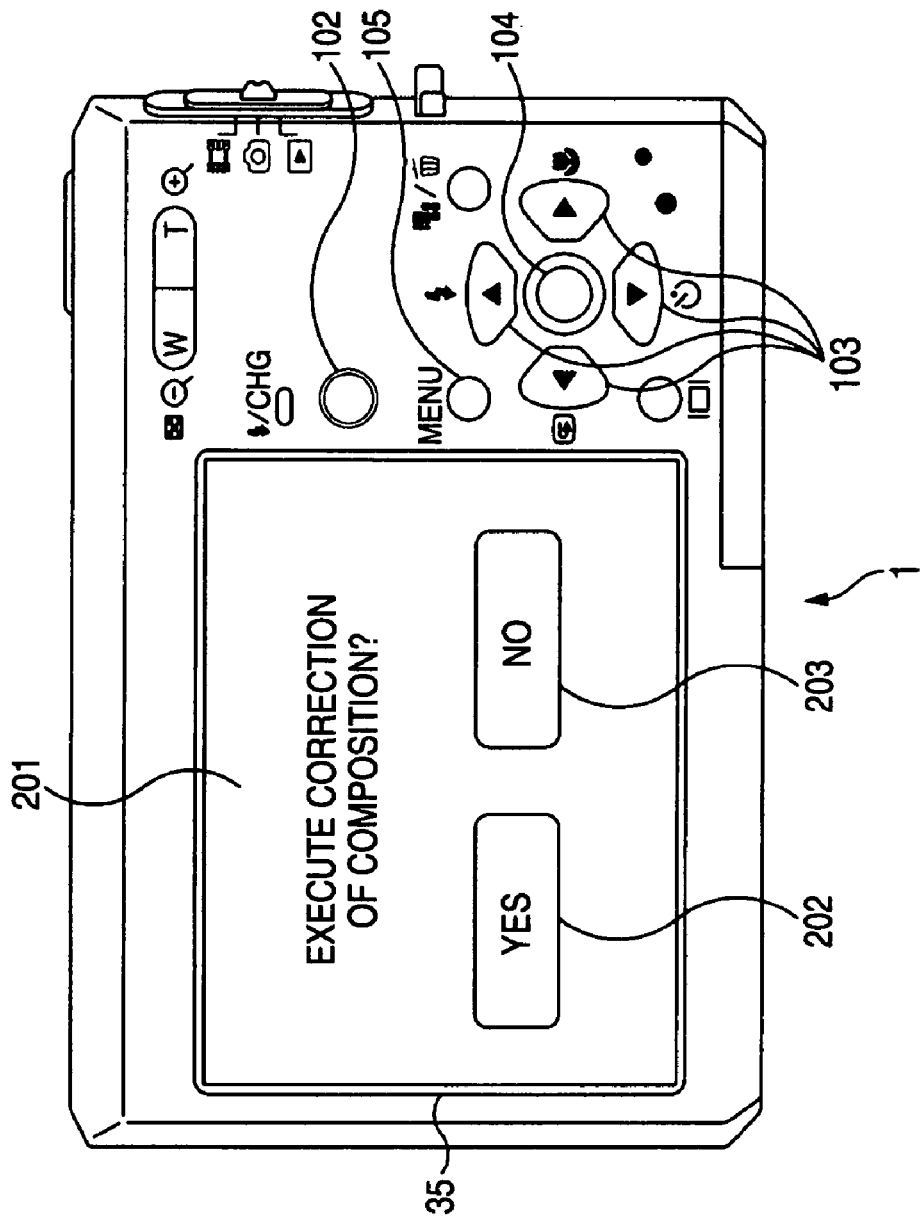
FIG. 21 is a diagram showing the display unit and the input unit of the digital camera.

In step S51, the display control unit 74 controls the image display engine 55 to cause the display unit 35 to display a screen for accepting an instruction for correction of a composition. For example, in step S51, a screen 201 for accepting an instruction for correction of a composition, on which characters such as "execute correction of a composition?" are arranged, is displayed on the display unit 35 as shown in FIG. 21. On the screen 201, a button 202 for instructing correction of compositions of all the original images 101 stored in the medium 11 as image data and a button 203 for instructing cancellation of correction of the compositions are arranged.

In step S52, the composition correcting unit 72 judges, on the basis of a signal supplied from the input unit 36 through the input interface 60 and the data bus 61 according to operation by the user, whether correction of the compositions of all the original images 101 stored in the medium 11 as image data is instructed.

For example, in step S52, when among the touch panel areas provided superimposedly on the display unit 35, a position where the button 202 is displayed is tapped or when the button 202 is focused by the cross button 103 and the determination button 104 is depressed to operate the button 202, the composition correcting unit 72 judges that correction of the compositions of all the original images 101 stored in the medium 11 as image data is instructed. For example, in step S52, when among the touch panel areas provided superimposedly on the display unit 35, a position where the button 203 is displayed is tapped or when the button 203 is focused by the cross button 103 and the determination button 104 is depressed to operate the button 203, the composition correcting unit 72 judges that cancellation of correction of the compositions is instructed and correction of the compositions is not instructed.

Figure 22:
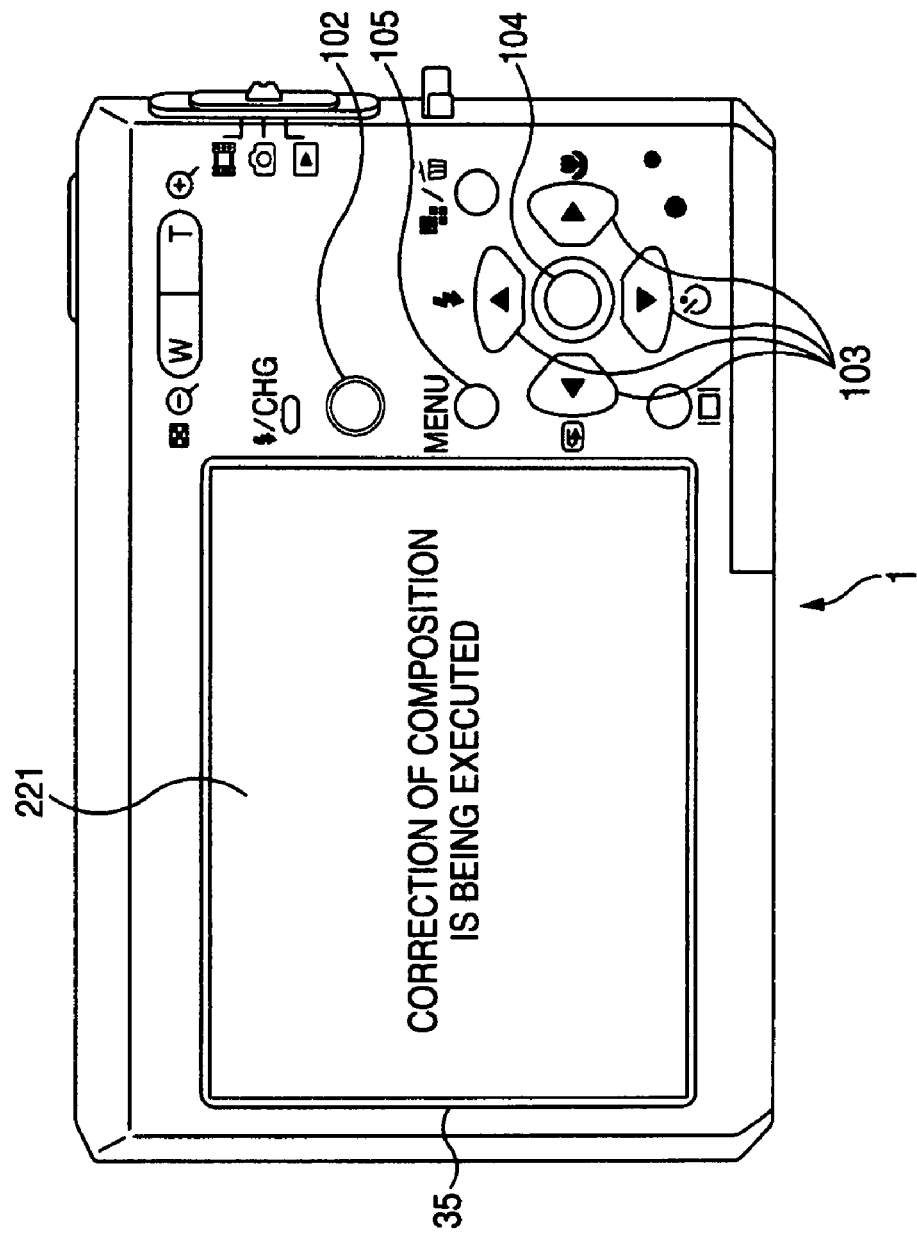
FIG. 22 is a diagram showing the display unit and the input unit of the digital camera.

When it is judged in step S52 that correction of the compositions of all the original images 101 stored in the medium 11 as image data is instructed, a screen 221 indicating that the processing for correction of a composition is being executed, on which characters such as "correction of compositions is being executed" is displayed on the display unit 35 as shown in FIG. 22, and the processing proceeds to step S53. The image reading unit 71 reads the original image 101 to be subjected to correction of a composition from the medium 11.

For example, in step S53, the image reading unit 71 causes the external media controller 59 to read out the image data stored in the medium 11 from the medium 11. When the image data read out is encoded in the JPEG system, the image reading unit 71 causes the JPEG engine 52 to decode the image data. The image reading unit 71 stores the image data read out from the medium 11 in this way in the specific storage area for storing the original image 101 to be subjected to correction of a composition in the storage area of the RAM 34 to thereby read the original image 101.

Since the steps S54 to S56 are the same as steps S14 to S16 in FIG. 5, respectively, explanation of the steps is omitted.

Since the steps S57 and S58 are the same as steps S18 and S19 in FIG. 5, respectively, explanation of the steps is omitted.

Since step S59 is the same as step S22 in FIG. 5, explanation of the step is omitted.

In step S60, the composition correcting unit 72 judges whether the compositions of all the original images 101 stored in the medium 11 as image data have been corrected. For example, in step S60, the composition correcting unit 72 judges, by comparing a total number of the original images 101 stored in the medium 11 as image data, which is notified from the image reading unit 71, with the number of the original images 101, the compositions of which have been corrected by the processing in steps S54 to S59, whether the compositions of all the original images 101 stored in the medium 11 as image data have been corrected.

When it is judged in step S60 that the compositions of all the original images 101 stored in the medium 11 as image data have not been corrected, since there still remains original images 101, the compositions of which should be corrected, the processing proceeds to step S61. The image reading unit 71 reads the next original image 101 to be subjected to correction of a composition from the medium 11. The processing returns to step S54. The processing described above is repeated with the next original image 101 as an object.

When it is judged in step S60 that the compositions of all the original images stored in the medium 11 as image data have been corrected, the processing ends.

When it is judged in step S52 that correction of the compositions of all the original images 101 is not instructed, since it is unnecessary to correct the compositions, the processing ends skipping steps S53 to S61.

In this way, it is possible to collectively correct the compositions of the plural original images 101 stored in the medium as image data. In other words, it is possible to easily slice the image after slicing 151 formed in a preferred composition obtained by correcting the composition of each of the plural original images stored in the medium 11 as image data and it is possible to save the image after slicing 151.

Consequently, it is possible to cause the display unit 35 to arbitrary display, like the original image 101, the image after sliding 151 obtained by correcting the composition of the original image 101 stored in the medium 11 as image data. The user can arbitrarily view such an image after slicing 151.

It is possible to apply the present invention not only to the digital camera 1 but also to apparatuses that treat images such as an apparatus that images an image, an apparatus that displays an image, and an apparatus that saves an image. Specifically, it is possible to apply the present invention to a cellular phone, a portable image reproducing apparatus, a stationary image reproducing apparatus or image recording apparatus, a storage apparatus that stores an imaged image and the like, a server that provides an image, and the like.

The image may be a still image or may be a moving image. For example, when a composition of an original image, which is a moving image, is corrected, if the processing described above is applied to a frame of a time interval decided in advance to determine an area such that an area continuously changes according to the elapse of time on the moving image with the determined area as a reference, it is possible to slice a moving image having a preferable composition.

In this way, when an image having a preferable composition is sliced from an original image, it is possible to obtain an image having a preferable composition. When the center of gravity of each of plural images of interest, which are images to which attention is paid among images included in an original image, is detected, an overall center of gravity, which is the center of gravity of all the plural images of interest, is calculated from the center of gravity of each of the plural images of interest, and an area in the original image is determined such that a ratio of a distance from one edge of opposed edges of the area to the overall center of gravity to a distance from the other edge of the opposed edges of the area to the overall center of gravity takes a value decided in advance so as to arouse an aesthetic sense, it is possible to easily slice an image having a preferable composition.

The series of processings described above can be executed by hardware or can be executed by software. When the series of processings are executed by the software, a program forming the software is installed in a computer built in dedicated hardware or a computer capable of executing various functions by installing various programs, for example, a general-purpose personal computer, from a program recording medium.

FIG. 23 is a block diagram showing an example of a structure of a personal computer that executes the series of processing according to a program. A CPU (Central Processing Unit) 301 executes various kinds of processings in accordance with a program stored in a ROM (Read Only Memory) 302 or a storing unit 308. Programs executed by the CPU 301, data, and the like are stored in a RAM (Random Access Memory) 303 as appropriate. The CPU 301, the ROM 302, and the RAM 303 are connected to one another by a bus 304.

An input/output interface 305 is also connected to the CPU 301 via the bus 304. An input unit 306 including a keyboard, a mouse, and a microphone and an output unit 307 including a display and a speaker are connected to the input/output interface 305. The CPU 301 executes various kinds of processings in response to commands inputted from the input unit 306. The CPU 301 outputs the results of the processings to the output unit 307.

The storing unit 308 connected to the input/output interface 305 includes a hard disk and stores the programs executed by the CPU 301 and various data. A communication unit 309 communicates with external apparatuses via networks such as the Internet and a local area network.

Programs can be acquired via the communication unit 309 and stored in the storing unit 308.

When a removable medium 311 such as a magnetic disk, an optical disk, a magneto-optical disk, or a semiconductor memory is inserted in a drive 310 connected to the input/output interface 305, the drive 310 drives the removable medium 311 and acquires programs, data, and the like recorded in the removable medium 311. The programs and the data acquired are transferred to the storing unit 308 and stored therein when necessary.

Program recording media that store programs installed in the computer and executable by the computer include, as shown in FIG. 23, the removable medium 311 as a package medium such a magnetic disk (including a flexible disk), an optical disk (including a CD-ROM (Compact Disc-Read Only Memory) and a DVD (Digital Versatile Disc), including a magneto-optical disk), or a semiconductor memory, the ROM 302 in which programs are temporarily or permanently stored, and the hard disk that forms the storing unit 308. The storage of the programs in the program recording media is performed using wire or wireless communication media such as a local area network, the Internet, and a digital satellite broadcast via the communication unit 309 serving as an interface such as a router and a modem when necessary.

In this specification, steps describing the programs stored in the program recording media include not only processings performed in time series according to a described order but also processings executed in parallel or individually, although not always executed in time series.

Embodiments of the present invention are not limited to the embodiments described above. Various modifications are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus, comprising:
    first detecting means for detecting plural images of interest which are images to which attention is paid among images included in an original image;
    second detecting means for detecting, for each of the plural images of interest, a respective center of gravity of that image of interest and a degree of interest value of that image of interest;
    calculating means for calculating an overall center of gravity, which is a weighted center of gravity of all the plural images of interest, from the centers of gravity of each of the plural images of interest with the degree of interest value as a weight; and
    determining means for determining an area in the original image such that a ratio of a distance between one edge of opposed edges of the area and the overall center of gravity to a distance between the other edge of the opposed edges of the area and the overall center of gravity takes a value decided in advance.

2. An image processing apparatus according to claim 1, further comprising generating means for slicing an image in the area, which is determined by the determining means, from the original image and generating a new image.

3. An image processing apparatus according to claim 2, further comprising converting means for converting a number of pixels of the new image generated by the generating means into a predetermined number of pixels.

4. An image processing apparatus according to claim 1, wherein the determining means determines the area of a rectangular shape such that a ratio of a distance from one edge of vertically or horizontally opposed edges of the rectangular area to the overall center of gravity to a distance from the other edge of the opposed edges of the area to the overall center of gravity takes the value decided in advance so as to arouse an aesthetic sense.

5. An image processing apparatus according to claim 4, wherein the determining means determines the rectangular area having an aspect ratio same as an aspect ratio of the original image.

6. An image processing apparatus according to claim 5, wherein the determining means determines the area having a largest size in the original image.

7. An image processing apparatus according to claim 1, wherein the determining means determines the area such that the ratio takes any value from 1:1 to 1:2.2.

8. An image processing apparatus according to claim 1, wherein the determining means determines the area such that the ratio is 1:2.

9. An image processing apparatus according to claim 8, wherein the determining means determines the area in the original image such that a ratio of a distance from one edge of vertically opposed edges of the area to the overall center of gravity to a distance from the other edge of the vertically opposed edges of the area to the overall center of gravity is 1:2.

10. An image processing apparatus according to claim 1, wherein the determining means determines the area such that the ratio is a golden ratio.

11. An image processing apparatus according to claim 10, wherein the determining means determines the area in the original image such that a ratio of a distance from one edge of vertically opposed edges of the area to the overall center of gravity to a distance from the other edge of the vertically opposed edges of the area to the overall center of gravity is the golden ratio.

12. An image processing method, comprising:
    using a processor to carry out the following:
        detecting plural images of interest, which are images to which attention is paid among images included in an original image,
        detecting, for each of the plural images of interest, a respective center of gravity of that image of interest and a degree of interest value of that image of interest,
        calculating an overall center of gravity, which is a weighted center of gravity of all the plural images of interest, from the centers of gravity of each of the plural images of interest with the degree of interest value as a weight, and
        determining an area in the original image such that a ratio of a distance between one edge of opposed edges of the area and the overall center of gravity to a distance between the other edge of the opposed edges of the area and the overall center of gravity takes a value decided in advance.

13. A processor encoded with computer program for causing a computer to execute an image processing method, the method comprising:
    detecting plural images of interest which are images to which attention is paid among images included in an original image;
    detecting, for each of the plural images of interest, a respective center of gravity of that image of interest and a degree of interest value of that image of interest;
    calculating an overall center of gravity, which is a weighted center of gravity of all the plural images of interest, from the centers of gravity of each of the plural images of interest with the degree of interest value as a weight; and
    determining an area in the original image such that a ratio of a distance between one edge of opposed edges of the area and the overall center of gravity to a distance between the other edge of the opposed edges of the area and the overall center of gravity takes a value decided in advance.

14. An imaging apparatus, comprising:
    first detecting means for detecting plural images of interest which are images to which attention is paid among images included in an original image;
    second detecting means for detecting, for each of the plural images of interest, a respective center of gravity of that image of interest and a degree of interest value of that image of interest;
    calculating means for calculating an overall center of gravity, which is a weighted center of gravity of all the plural images of interest, from the centers of gravity of each of the plural images of interest with the degree of interest value as a weight; and
    determining means for determining an area in the original image such that a ratio of a distance between one edge of opposed edges of the area and the overall center of gravity to a distance between the other edge of the opposed edges of the area and the overall center of gravity takes a value decided in advance.

15. An imaging apparatus according to claim 14, further comprising generating means for slicing an image in the area, which is determined by the determining means, from the original image and generating a new image.

16. An imaging apparatus according to claim 15, further comprising converting means for converting a number of pixels of the new image generated by the generating means into a predetermined number of pixels.

17. An imaging apparatus according to claim 14, wherein the determining means determines the area of a rectangular shape such that a ratio of a distance from one edge of vertically or horizontally opposed edges of the rectangular area to the overall center of gravity to a distance from the other edge of the opposed edges of the area to the overall center of gravity takes the value decided in advance so as to arouse an aesthetic sense.

18. An imaging apparatus according to claim 17, wherein the determining means determines the rectangular area having an aspect ratio same as an aspect ratio of the original image.

19. An imaging apparatus according to claim 18, wherein the determining means determines the area having a largest size in the original image.

20. An imaging apparatus according to claim 14, wherein the determining means determines the area such that the ratio takes any value from 1:1 to 1:2.2.

21. An imaging apparatus according to claim 14, wherein the determining means determines the area such that the ratio is 1:2.

22. An imaging apparatus according to claim 21, wherein the determining means determines the area in the original image such that a ratio of a distance from one edge of vertically opposed edges of the area to the overall center of gravity to a distance from the other edge of the vertically opposed edges of the area to the overall center of gravity is 1:2.

23. An imaging apparatus according to claim 14, wherein the determining means determines the area such that the ratio is a golden ratio.

24. An imaging apparatus according to claim 23, wherein the determining means determines the area in the original image such that a ratio of a distance from one edge of vertically opposed edges of the area to the overall center of gravity to a distance from the other edge of the vertically opposed edges of the area to the overall center of gravity is the golden ratio.

25. An image processing apparatus, comprising:
a first detecting unit detecting plural images of interest which are images to which attention is paid among images included in an original image;
a second detecting unit detecting, for each of the plural images of interest, a respective center of gravity of that image of interest and a degree of interest value of that image of interest;
a calculating unit calculating an overall center of gravity, which is a weighted center of gravity of all the plural images of interest, from the centers of gravity of each of the plural images of interest with the degree of interest value as a weight; and
a determining unit determining an area in the original image such that a ratio of a distance between one edge of opposed edges of the area and the overall center of gravity to a distance between the other edge of the opposed edges of the area and the overall center of gravity takes a value decided in advance.

26. An imaging apparatus, comprising:
a detecting unit that detects plural images of interest which are images to which attention is paid among images included in an original image;
a second detecting unit that detects, for each of the plural images of interest, a respective center of gravity of that image of interest and a degree of interest value of that image of interest;
a calculating unit that calculates an overall center of gravity, which is a weighted center of gravity of all the plural images of interest, from the centers of gravity of each of the plural images of interest with the degree of interest value as a weight; and
a determining unit that determines an area in the original image such that a ratio of a distance between one edge of opposed edges of the area and the overall center of gravity to a distance between the other edge of the opposed edges of the area and the overall center of gravity takes a value decided in advance.

* * * * *